United States Patent [19]
Prokai et al.

[11] 3,935,123
[45] Jan. 27, 1976

[54] POLYSILOXANE-POLYOXYALKYLENE COMPOSITIONS USED IN POLYURETHANE FOAM

[75] Inventors: Bela Prokai, Mahopac; Bernard Kanner, West Nyack, both of N.Y.

[73] Assignee: Union Carbide Corporation, New York, N.Y.

[22] Filed: Sept. 20, 1974

[21] Appl. No.: 507,934

Related U.S. Application Data

[63] Continuation-in-part of Ser. No. 279,883, Aug. 11, 1972, Pat. No. 3,846,462.

[52] U.S. Cl. ............ 252/351; 428/921; 260/2.5 AH; 260/2.5 AJ
[51] Int. Cl.² .................. B01F 17/54; C08G 18/61
[58] Field of Search ................... 252/351, 321, 358; 260/2.5 AH, 448.2 N, 448.2 B

[56] References Cited
UNITED STATES PATENTS

| | | | |
|---|---|---|---|
| 3,026,278 | 3/1962 | Walton et al. | 260/18 |
| 3,177,236 | 4/1965 | Jex et al. | 260/448.2 N |
| 3,234,252 | 2/1966 | Pater | 260/448.2 |
| 3,402,192 | 9/1968 | Haluska | 260/448.2 |
| 3,560,544 | 2/1971 | Haluska | 260/448.2 |
| 3,595,897 | 7/1971 | Brown et al. | 260/448.2 E |
| 3,703,489 | 11/1972 | Morehouse | 260/2.5 AH |
| 3,706,681 | 12/1972 | Bachura | 260/2.5 AH |

FOREIGN PATENTS OR APPLICATIONS

1,158,670   7/1969   United Kingdom

*Primary Examiner*—Benjamin R. Padgett
*Assistant Examiner*—David Leland
*Attorney, Agent, or Firm*—Marylin Klosty

[57] ABSTRACT

Provided as novel compositions which are especially useful as stabilizers of flame-retarded, flexible polyether polyol-based urethane foam, is an admixture containing from about 10 to about 90 weight percent of Component A and from about 90 to about 10 weight percent of Component B, said percentages being based on the total weight of A and B contained in the admixture, wherein: Component A is a cyano-bearing polysiloxane-polyoxyalkylene copolymer having the average composition,

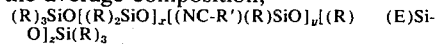

wherein R is alkyl, R' has at least two carbon atoms and is bivalent alkylene or an oxyalkylene group the oxygen atom of which is bonded to silicon, and the respective average values of $x$, $y$ and $z$ are from about 10 to about 200 ($x$), from about 3 to about 100 ($y$) and from about 2 to about 30 ($z$), and E comprises a polyoxyalkylene block the oxyalkylene content of which is constituted of from about 20 to about 65 weight percent oxyethylene; and Component B is a p-olyalkylsiloxane-polyoxyalkylene copolymer the oxyalkylene content of which is constituted of from about 20 to about 75 weight percent oxyethylene. The admixtures of the invention may also contain an organic component such as, in particular, normally liquid polyoxyalkylene compounds.

36 Claims, No Drawings

POLYSILOXANE-POLYOXYALKYLENE COMPOSITIONS USED IN POLYURETHANE FOAM

This application is a continuation-in-part of our prior and copending application Ser. No. 279,883, filed Aug. 11, 1972, now U.S. Pat. No. 3,846,462.

BACKGROUND OF THE INVENTION

The present invention relates to novel compositions comprising particular polysiloxane-polyoxyalkylene polymers and to the use of such compositions in the manufacture of urethane cellular products, particularly flame-retarded flexible polyether polyol-based urethane foam.

Our aforementioned copending application Ser. No. 279,883, filed Aug. 11, 1972, now U.S. Pat. No. 3,846,462 provides a particular class of cyanoalkyl- and/or cyanoalkoxy-modified polysiloxane-polyoxyalkylene block polymers which are especially useful as foam stabilizers of polyether polyol-based urethane foam. As described in said application, such polymers have a highly desirable combination of properties. One such property is good surfactant potency from the standpoint of both (1) the measured original height to which the foam rises as it is being formed and (2) the ability to maintain the original height of the foam once it has formed.

Another highly desirable property of the aforesaid class of cyano-bearing polymers is their good processing latitude, that is, the ability to provide foams of satisfactory quality over a relatively wide range of operating variables, such as, for example, variation in polymer concentration and in the concentration of metal co-catalysts which are normally employed in the manufacture of flexible polyether-based foams. The more common co-catalysts are organic derivatives of tin and thus sensitivity to variation in co-catalyst concentration is more particularly referred to in the art as "tin operating latitude." Decreasing the concentration of such co-catalysts below normal levels is sometimes necessary to improve foam breathability but, if the effectiveness of the foam stabilizer is narrowly dependent on co-catalyst concentration (that is, its tin operating latitude is poor), the desired enhanced breathability will be offset by foam weakness due to split formation. It is evident, therefore, that the good tin operating latitude of our aforesaid class of cyano-bearing polymers is a significant property.

In addition to good potency and processing latitude, our aforesaid cyano-bearing polysiloxane-polyoxyalkylene polymers possess the further highly desirable property of allowing for the formation of flame-retarded, polyether urethane foam of relatively low burning extent and high porosity (as opposed to "tight" foam and as reflected by foam breathability).

Notwithstanding the aforementioned excellent combination of properties exhibited by the cyano-modified polysiloxane-polyoxyalkylene block copolymers of our aforementioned application, it has been found that, when employed as the foam stabilizing component of foam formulations having low density foam specifications, such polymers often provide foam having a density which is higher than the density specification with a corresponding production of less foam per unit volume. Although the foam product is acceptable and useful and, although the numerical value of the density may only be slightly higher than desired, the consequential production of less foam per unit volume is of significant concern to the large scale producer of urethane foam. It is desirable, therefore, and is a primary object of this invention to provide foam stabilizing compositions which allow for minimization of this particular problem without substantial sacrifice of the highly desirable combination of properties possessed by our aforementioned class of cyano-bearing polysiloxane-polyoxyalkylene polymers. Various other objects and advantages of this invention will become apparent to those of ordinary skill in the art from the accompanying description and disclosure.

SUMMARY OF THE INVENTION

In accordance with one aspect of the present invention, novel compositions are provided as an admixture containing from about 10 to about 90 weight percent of Component A and from about 90 to about 10 weight percent of Component B, said percentages being based on the total weight of A and B contained in the admixture, wherein:

Component A is a cyano-bearing polysiloxane-polyoxyalkylene copolymer having the average composition encompassed by the following Formula I,

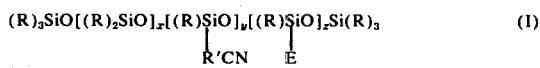

where R is alkyl having from 1 to 10 carbon atoms, R' is bivalent alkylene (—R°—) or an oxyalkylene group (—OR°—) the oxygen atom of which is bonded to silicon, R° having at least 2 and usually no more than 12 carbon atoms, $x$ has an average value from about 10 to about 200, $y$ has an average value from about 3 to about 100, $z$ has an average value from about 2 to about 30, and E comprises a polyoxyalkylene block the oxyalkylene content of which is constituted of from about 20 to about 65 weight percent of oxyethylene; and Component B is a polyalkylsiloxane-polyoxyalkylene copolymer in which the polyoxyalkylene content is constituted of from about 20 to about 75 weight percent of oxyethylene.

One class of suitable copolymers encompassed by Component B are polyalkylsiloxane-polyoxyalkylene copolymers containing difunctional dialkylsiloxy units $[(R)_2SiO_{2/2}]$ in combination with monofunctional trialkylsiloxy units $[(R)_3SiO_{1/2}]$ and difunctional monoalkylsiloxy units $[(R)SiO_{2/2}]$ wherein the remaining valence of silicon is in association with a polyoxyalkylene block-bearing moiety which is designated herein as E°. The said units may be present in the copolymer as essentially the sole types of units or they may be in further combination with trifunctional monoalkylsiloxy units $[(R)SiO_{3/2}]$. Illustrative of this class of polymers encompassed by Component B are those having the average composition depicted by Formula II,

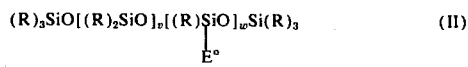

where R is alkyl having from 1 to 10 carbon atoms, $v$ has an average value from about 10 to about 60, $w$ has an average value from about 2 to about 10, and E° comprises a polyoxyalkylene block the oxyalkylene content of which is constituted of from about 20 to about 75 weight percent of oxyethylene.

Also included within the scope of Component B of the admixtures of this invention are polysiloxane-polyoxyalkylene copolymers which comprise sub-blocks of difunctional dialkylsiloxy units associated with a trifunctional monoalkylsiloxy unit and a polyoxyalkylene block such that the polysiloxane and polyoxyalkylene portions of the polymer are linked directly through an Si—O—C linkage.

The compositions of the present invention may consist essentially of the aforesaid polymer Components A and B, or they may contain one or more organic components such as, in particular, normally liquid poly(oxyalkylene) compounds.

In accordance with another aspect of the present invention, a process is provided for producing flexible polyurethane foam which comprises reacting and foaming a reaction mixture of: (a) a polyether polyol reactant containing an average of at least two hydroxyl groups per molecule; (b) a polyisocyanate reactant containing at least two isocyanato groups per molecule; (c) a blowing agent; (d) a catalyst comprising an amine; (e) a co-catalyst comprising an organic derivative of a polyvalent metal such as tin; and (f) a foam stabilizing component which comprises the aforesaid admixture of the respective polysiloxane-polyoxyalkylene polymers referred to herein as Components A and B. In accordance with one embodiment of this aspect of the invention, flame-retarded flexible polyether-based urethane foam is provided by including a flame-retardant in the foam-producing reaction mixture as an additional component thereof.

In providing either non flame-retarded or flame-retarded foam, the admixture of Component A and Component B can be introduced to the foam-producing reaction mixture either as such, in diluted form, in combination with organic surfactants, or preblended with one or more of the polyether polyol reactant, blowing agent, amine catalyst and, when used, the flame-retarding agent.

In addition to the substantial retention of the aforementioned desirable combination of properties as stabilizers of both non flame-retarded and flame-retarded foam exhibited by the polymers encompassed by Component A, the surfactant compositions of this invention containing Component A in combination with Component B, offer additional advantage as the foam-stabilizing ingredient of reaction mixtures (or foam formulations) having low density foam specifications. The foam stabilizing compositions of the invention are also useful in providing high density foam and are thus highly versatile materials which can be used to meet foam specifications of a wide variety of foam formulations.

DETAILED DESCRIPTION OF THE INVENTION AND PREFERRED EMBODIMENTS

In the cyanoalkyl- and/or cyanoalkoxy-modified polyalkylsiloxane-polyoxyalkylene copolymers within the scope of Component A of the compositions of the invention, the polyoxyalkylene block-bearing moiety (E) comprises a monovalent organic-terminated polyoxyalkylene chain, $-(OC_aH_{2a})_bOW$, wherein W is an organic cap, $a$ has a value from 2 to 4 provided from about 20 to about 65 weight percent of the polyoxyalkylene chain, $-(OC_aH_{2a})_b-$, is constituted of oxyethylene, and $b$ is a positive number the average value of which is such that the average molecular weight of the polyoxyalkylene chain is from about 1000 to about 6000.

In the unmodified polyalkylsiloxane-polyoxyalkylene copolymers within the scope of Component B of the compositions of the invention, the polyoxyalkylene block-bearing moiety (E°) also comprises a monovalent organic-terminated polyoxyalkylene chain, $-(OC_dH_{2d})_fOW$, wherein W is an organic cap, $d$ has a value from 2 to 4 provided from about 20 to about 75 weight percent of the polyoxyalkylene chain, $-(OC_dH_{2d})_f-$, is constituted of oxyethylene, and $f$ is a positive number the average value of which is such that the average molecular weight of the polyoxyalkylene chain is from about 800 to about 6000 and is preferably no higher than about 4000.

In regard to the respective polyoxyalkylene blocks, $-(OC_aH_{2a})_bOW$ and $-(OC_dH_{2d})_fOW$, the polyoxyethylene contents of which are as defined hereinabove, the remainder of the polyoxyalkylene chain is usually formed of oxypropylene, oxybutylene or a combinaton of such units, although preferably the remainder is oxypropylene. It is to be understood that the oxyethylene and other oxyalkylene units can be randomly distributed throughout the respective polyoxyalkylene chains or they can be grouped in respective sub-blocks, provided the total average content of $-(C_2H_4O)-$ is within the aforementioned respective ranges.

The aforesaid groupings or polyoxyalkylene blocks, $-(OC_aH_{2a})_bOW$ and $-(OC_dH_{2d})_fOW$, of the E and E° moieties of the respective copolymers of Components A and B of the admixtures of this invention, are linked to a silicon atom of the polysiloxane portion of the respective copolymers either (1) directly so as to form an Si—O—C linkage, or (2) through a bivalent organic radical ($-R''-$) comprising a bivalent alkylene group a carbon atom of which is bonded to silicon so as to form an Si—C linkage. These various types of copolymers are encompassed by the following Formula I-A of cyano-bearing polymeric Component A and Formula II-B which illustrates one class of polymers included within the definition of Component B:

FORMULA I-A

wherein:
  R is alkyl having from 1 to 10 carbon atoms;
  R' is bivalent alkylene ($-R°-$) or an oxyalkylene group ($-OR°-$) the oxygen atom of which is bonded to silicon, R° having at least 2 and usually no more than 12 carbon atoms;
  R'' is a bivalent alkylene group, an -alkylene-C(O)— or an -alkylene-NHC(O)— group where in each instance the indicated free valence of alkylene is bonded to silicon;
  $x$ has an average value from about 10 to about 200, and usually has an average value from about 20 to about 100;
  $y$ has an average value from about 3 to about 100, and usually has an average value from about 4 to about 30;
  $z$ has an average value from about 2 to about 30, and usually has an average value from about 2 to about 10;
  W is an organic cap;
  $p$ is zero or one;

$a$ has a value from 2 to 4 provided from about 20 to about 65 weight percent of the oxyalkylene units of the polyoxyalkylene chain, $-(C_aH_{2a}O)_b-$, is constituted of oxyethylene units; and $b$ has an average value such that the average molecular weight of the polyoxyalkylene chain is from about 1000 to about 6000.

FORMULA II-B

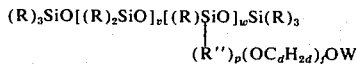

wherein:

R, as previously defined herein, is alkyl having from 1 to 10 carbon atoms;

R'', as previously defined herein, is a bivalent alkylene group, an -alkylene-C(O)— or an -alkylene-NHC(O)— group where in each instance the indicated free valence of alkylene is bonded to silicon;

W, as previously defined herein, is an organic cap;

$v$, as previously defined, has an average value from about 10 to about 60;

$w$, as previously defined, has an average value from about 2 to about 10;

$p$ is zero or one;

$d$ has a value from 2 to 4 provided from about 20 to about 75 weight percent of the polyoxyalkylene chain, $-(OC_dH_{2d})_f-$, is constituted of oxyethylene; and $f$ has an average value such that the average molecular weight of the polyoxyalkylene chain is from about 800 to about 6000 and is preferably no more than about 4000.

It is evident, therefore, that the cyano-bearing copolymers included within the scope of Component A of the compositions of the invention, as well as the copolymers included within the scope of Component B, may be of the non hydrolyzable type (that is, when p of Formulas I-A and II-B is one) or they may be of the hydrolyzable type (that is, when p of Formulas I-A and II-B is zero).

In the respective polymer compositions encompassed by Formulas I-A and II-B, the bivalent alkylene group of the linking member represented by R'', has the more specific formula, $-C_eH_{2e}-$, where $e$ has a value from 2 to 6 and is usually no more than four. Illustrative of suitable groups encompassed by R'' are: ethylene; trimethylene; propylene, tetramethylene; hexamethylene; corresponding $-C_eH_{2e}-C(O)-$ groups which together with oxygen of the polyoxyalkylene chain form an ester linkage; and corresponding $-C_eH_{2e}-NH-C(O)-$ groups which in combination with oxygen of the polyoxyalkylene chain form carbamate linkages.

As indicated with specific reference to Formulas I-A and II-B, W of the respective polyoxyalkylene blocks is an organic group which caps the polyoxyalkylene chains. Illustrative of the caps encompassed by W are such groups as: $R^{\circ\circ}-$, $R^{\circ\circ}NHC(O)-$, and $R^{\circ\circ}C(O)-$, wherein $R^{\circ\circ}$ is a monovalent hydrocarbon radical having from 1 to 12 carbon atoms, and is usually free of aliphatic unsaturation. The groups (WO—) which endblock the polyoxyalkylene chains are, therefore, corresponding $R^{\circ\circ}O-$, $R^{\circ\circ}NHC(O)O-$ and $R^{\circ\circ}C(O)O-$ monovalent organic radicals. In the aforesaid capping (W) and terminal (WO—) groups, $R^{\circ\circ}$ can be any of the following: an alkyl group including linear and branched chain alkyls such as, for example, methyl, ethyl, n-propyl, isopropyl, n-butyl, t-butyl, octyl and dodecyl groups; a cycloaliphatic radical including monocyclic and bicyclic groups such as, for example, cyclopentyl, cyclohexyl and bicyclo[2.2.1]heptyl groups; an aromatically unsaturated group including aryl, alkaryl and aralkyl radicals such as, for example, phenyl, naphthyl, xylyl, tolyl, cumenyl, mesityl, t-butylphenyl, benzyl, beta-phenylethyl and 2-phenylpropyl groups; alkyl- and aryl- substituted cycloaliphatic radicals such as, for example, methylcyclopentyl and phenylcyclohexyl radicals; and the like. It is evident, therefore, that the terminal group (WO—) of the polyoxyalkylene chain can be corresponding alkoxy, aryloxy, aralkoxy, alkaryloxy, cycloalkoxy, acyloxy, aryl-C(O)O—, alkyl carbamate and aryl carbamate groups.

The generally preferred $R^{\circ\circ}$ groups are phenyl, lower alkyl radicals, the lower alkyl-substituted aryl groups and the aryl-substituted lower alkyl groups, wherein the term "lower alkyl" denotes $C_1-C_4$ alkyl radicals. Therefore, illustrative of the preferred capping groups are: methyl, ethyl, propyl, butyl, phenyl, benzyl, phenylethyl ($C_6H_5-C_2H_4-$), acetyl, benzoyl, methylcarbamyl [$CH_3NHC(O)-$], ethylcarbamyl [$C_2H_5NHC(O)-$], propyl- and butyl-carbamyl groups, phenylcarbamyl [$C_6H_5NHC(O)-$], tolylcarbamyl [$(CH_3)C_6H_4NHC(O)-$], benzylcarbamyl [$C_6H_5CH_2NHC(O)-$], and the like.

It is to be understood that the terminal organic radical (WO—) of the respective polyoxyalkylene blocks of the polymers encompassed by Component A and of the Component B polymers of the class defined by Formula II-B may be the same throughout the polymers or they may differ within or as between the respective polymers. For example, either one or both types of polymers can contain polyether blocks in which the terminal group (WO—) is methoxy, and other polyether groups in which WO— is butoxy, acetoxy, a hydrocarbyl-carbamate group such as methylcarbamate [$CH_3NHC(O)O-$] or benzyloxy ($C_6H_5CH_2O-$).

Another class of polyalkylsiloxane-polyoxyalkylene copolymers which are within the scope of Component B of the surfactant compositions of this invention and in which the polysiloxane and polyoxyalkylene portions of the copolymer are linked through an Si—O—C linkage, are those comprised of the units shown in the following expression,

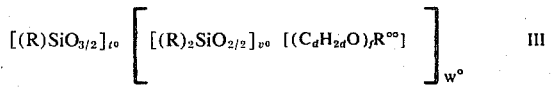

wherein:

R, as previously defined herein, is alkyl having from 1 to 10 carbon atoms;

$R^{\circ\circ}$, as previously defined herein, is a monovalent hydrocarbon group having from 1 to 12 carbon atoms;

$d$, as defined with respect to Formula II-B, has a value from 2 to 4 provided from about 20 to about 75 weight percent of the polyoxyalkylene chain is constituted of oxyethylene;

$f$, as defined with respect to Formula II-B, has an average value such that the average molecular weight of the polyoxyalkylene chain is from about 800 to about 6000 and is preferably no more than about 4000;

$t°$ has an average value from about 0.8 to about 2;
$v°$ has an average value from about 3 to about 20; and
$w°$ has an average value from about 2 to about 4.

It is to be understood that the class of polymers depicted by the above expression (III) also comprises polymers containing residual silicon-bonded alkoxy groups (Si—OR, where R is alkyl of 1 to 10 carbon atoms) derived from alkyltrialkoxysilanes employed in their preparation, and that R of such residual alkoxy may satisfy oxygen of the trifunctional and/or difunctional siloxy units.

In the use of the compositions of this invention as foam stabilizers of flexible polyether urethane foam, for any given cyano-bearing polymer composition within the scope of Component A (Formulas I and I–A), the particular average values of $x$, $y$ and $z$ are such that the polymer has an average polysiloxane content of from about 15 to about 45 weight percent of the total weight of the polymer, the remaining weight being constituted essentially of the polyoxyalkylene blocks, $-(OC_aH_{2a})_bOW$, and when present, the linking group, $-R''-$. Further in this regard, for any given polymer composition within the scope of Component B, the average polysiloxane content is from about 10 to about 35 weight percent, the remaining weight being constituted essentially of $E°$, that is, the polyoxyalkylene blocks, $(-OC_dH_{2d})_fOW$, and when present, the linking group, $-R''-$. For example, in Formulas II and II–B, the particular values of $v$ and $w$ in any given polymer composition are such that the combined average weight of the $(R)_3SiO_{1/2}$, $(R)_2SiO_{2/2}$, and $(R)SiO_{2/2}$ units is from about 10 to about 35 weight percent of the total weight of the polymer. In the above-described further class of Component B polymers (III), the siloxane content is taken as the combined weight of (R)Si as contained in the trifunctional units, $OSi(R)_2$ of the difunctional units and the weight of the aforementioned silicon-bonded residual alkoxy groups, and is also from about 10 to about 35 weight percent of the total weight of the polymer, the remaining weight being essentially constituted of $E°$ which in this class of polymers is $-(OC_dH_{2d})_fOR^{\infty}$.

As indicated by Formulas I and I–A, the cyano-substituted groups ($-R'CN$) of the polymers encompassed by Component A may be bonded to silicon either through a silicon-to-carbon bond (when R' is an alkylene group, $-R°-$) or through a silicon-to-oxygen bond (when R' is an oxyalkylene group, $-OR°-$) as illustrated by the following Formulas I–A–1 and I–A–2:

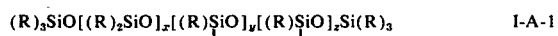

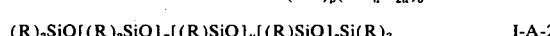

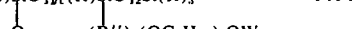

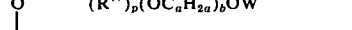

wherein: R, R°, R'', W, $x$, $y$, $z$, $p$, $a$ and $b$ are as previously defined. Thus, the polymers included within the scope of Component A of the compositions of this invention may be: (1) non hydrolyzable with respect to both the polyoxyalkylene block and cyano-substituted groups (when $p$ of Formula I–A–1 is one); (2) hydrolyzable with respect to both the polyoxyalkylene block and cyano-substituted groups (when $p$ of Formula I–A–2 is zero); (3) hydrolyzable with respect to the polyoxyalkylene block and non hydrolyzable with respect to the cyano-substituted groups (when $p$ of Formula I–A–1 is zero); and (4) non hydrolyzable with respect to the polyoxyalkylene block and hydrolyzable with respect to the cyano-substituted groups (when $p$ of Formula I–A–2 is one).

In the silicon-bonded, cyano-substituted $-R°CN$ and $-OR°CN$ groups of the Component A polymers, R° is a bivalent alkylene radical including linear and branched radicals of the series, $-C_cH_{2c}-$, where $c$ has a value of from 2 to 12 and is preferably not more than six. Illustrative of suitable groups represented by R° are: ethylene ($-CH_2CH_2-$); trimethylene; propylene [$-CH_2CH(CH_3)-$]; tetramethylene and higher homologues to dodecamethylene [$-(CH_2)_{12}-$]. The $-R°-$ groups are usually lower alkylene groups having from two to four carbon atoms. It is to be understood that the $-R°-$ groups may be the same throughout the polymer or they may differ and that the polymer may contain any combination of cyanoalkyl- ($NC-R°-$) and cyanoalkoxy- ($NC-R°O-$) substituted siloxy units.

In polymeric Components A and B of the compositions of this invention, the silicon-bonded R groups are, as previously defined, $C_1-C_{10}$ alkyls including linear and branched alkyls. Illustrative of suitable groups encompassed by R are: methyl, ethyl, n-propyl, isopropyl, n-butyl, t-butyl, pentyl, hexyl, octyl and decyl groups. Of the various groups represented by R, the lower alkyl groups (that is, those having from one to four carbon atoms) are preferred of which methyl is especially suitable. It is to be understood that the R groups may be the same throughout the respective polymers or they may differ as between or within units and as between the polymers. For example, the end-blocking monofunctional units, $R_3SiO_{1/2}-$, of Formulas I and II may be trimethylsiloxy units and the difunctional units, $R_2SiO_{2/2}$, may be diethylsiloxy or methylethylsiloxy units.

Preferred cyano-substituted polysiloxane-polyoxyalkylene copolymers within the scope of Component A are the gamma-cyanopropyl- and gamma-cyanopropoxy-substituted polymers having the following average compositions:

 I–A–3

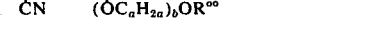 I–A–4

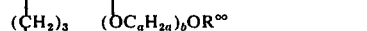 I–A–5

 I–A–6 wherein: Me is methyl ($-CH_3$); $x$ has an average value from about 20 to about 100; $y$ has an average value from about 4 to about 30; $z$ has an average value from about 2 to about 10; $e$ has a value from 2 to 4 and is most preferably three; $R^{\circ\circ}-$ is a lower alkyl, phenyl or ar(lower)alkyl group such as benzyl; and $-(OC_aH_{2a})_b-$ has an average molecular weight from about 1000 to about 6000 of which between about 20 and about 65 weight percent is composed of oxyethylene units, the remaining weight being constituted of oxypropylene units. More specifically, the preferred polyether content of the polymers within the scope of Component A of the admixtures of this invention is expressed as, $-(OC_2H_4)_n(OC_3H_6)_m-$, wherein $n$ has an average value from about 4.5 to about 90, and $m$ has an average value from about 6 to about 82, provided the average values of the oxyethylene content and molecular weight of the poly(oxyethylene-oxypropylene) chain are within the aforesaid respective ranges. Generally, the cyano-bearing copolymers encompassed by Formulas I-A-3 to I-A-6 have a particularly good combination of potency, processing latitude including "tin operating latitude" and allowed for the formation of flame-retarded polyether-based urethane foams which are not only self-extinguishing (by ASTM D-16-92-68) and of low burning extent, but are also of a relatively high porosity.

The cyano-bearing polysiloxane-polyoxyalkylene copolymers within the scope of Component A of the admixtures of this invention are prepared by any one of a number of reactions. One method by which the polymers encompassed by Formula I-A are prepared is as illustrated by the reaction of Equation 1 below which comprises the platinum-catalyzed addition of monoolefinic polyoxyalkylene ethers to the indicated cyano-substituted polyalkylsiloxane hydride fluids:

Equation 1

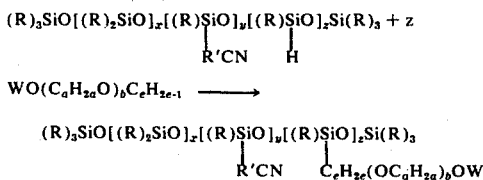

wherein, R, R', W, $x$, $y$, $z$, $a$, $b$ and $e$ have the aforesaid significance. Preferably, the monoolefinic group, $-C_eH_{2e-1}$, of the polyether reactant is vinyl, allyl or methallyl, the allyl endblocked reactants being especially suitable. One method for preparing such polyether reactants comprises starting alkylene oxide polymerization with an alkenol having at least three carbon atoms such as allyl alcohol to provide $HO(C_aH_{2a}O)_b$-$C_eH_{2e-1}$ (wherein $e$ has a value of at least 3), followed by capping of the terminal hydroxyl group with the aforesaid organic radical, W, such as methyl, phenyl, benzyl, acetyl, methylcarbamyl and like capping groups. Further details concerning the method of preparation of such polyether reactants are as described in British Patent Specifications 1,220,471 and 1,220,472. Alternatively, the polyether reactants can be prepared by starting the alkylene oxide polymerization with an alkanol such as methanol, an aralkyl alcohol such as benzyl alcohol, phenol and the like, followed by capping of the terminal hydroxyl group of the reaction product with the monoolefinic group such as vinyl, allyl, methallyl and the like. Of these various monoolefinically unsaturated polyether reactants for use in preparing the polymers of Component A of the admixtures of this invention, allyl alcohol-started polyoxyalkylene ethers are especially suitable. It is to be understood that the polyoxyalkylene chain, $-(C_aH_{2a}O)_b-$, of the polyether reactants is composed of from about 20 to about 65 weight per cent of oxyethylene units, $-(C_2H_4O)_n-$, the remaining oxyalkylene units being oxypropylene and/or oxybutylene. The different types of oxyalkylene units can be randomly distributed throughout the chain such as when a mixture of alkylene oxides is polymerized, or they can be arranged as sub-blocks such as when the respective alkylene oxides are polymerized sequentially.

The hydrosilation reaction illustrated by Equation 1 is effected in the presence of a platinum catalyst. Particularly effective is platinum in the form of chloroplatinic acid dissolved, if desired, in a solvent such as tetrahydrofuran, ethanol, butanol or mixed solvents such as ethanol-ethylene glycol dimethyl ether. It is to be understood, however, that other platinum derivatives known to the art as hydrosilation catalysts may also be used. The platinum is present in a catalytic amount such as from about 5 to about 300 parts per million (p.p.m.) parts by weight of the combined weight of the silicon-containing and organic reactants. The more usual platinum concentration is from about 5 to about 150 p.p.m. Suitable reaction temperatures range from about room temperature (25°C.) to about 200°C., and are more usually from about 60°C. to about 150°C.

Another method for preparing the cyano-bearing polysiloxane-polyoxyalkylene copolymers within the scope of Component A of the admixtures of this invention comprises the catalyzed condensation of silicon-bonded hydrogen of the Si—H fluids shown in Equation 1 with hydrogen of the —OH groups of hydroxyl-terminated polyether reactants. This method is as illustrated by the following Equation 2:

Equation 2

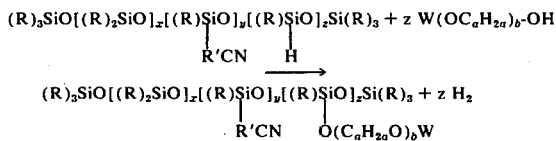

wherein R, R', $x$, $y$, $z$, $a$ and $b$ have the aforesaid significance.

The condensation reaction illustrated by Equation 2 is promoted by a variety of catalysts such as organic derivatives of tin, platinum and other transition metals. Especially suitable are organic derivatives of tin such as tin carboxylates which are typically illustrated by stannous octoate, stannous oleate, stannous laurate and dibutyl tin dilaurate. These catalysts are employed in amounts from about 0.1 to about 5, and usually no more than about 2, weight per cent, based on the total weight of the reactants. The Si—H/HO—C condensation reactions are effected at temperatures from about 60°C. to about 150°C., more usually from about 80°C. to about 120°C.

Further details pertaining to these and other methods for the preparation of the cyanoalkyl- and/or cyanoalkoxy-substituted polyalkylsiloxane copolymers within the scope of Component A of the compositions of this invention are as disclosed and described in our aforementioned application Ser. No. 279,883, filed Aug. 11, 1972, the teachings of which in these respects are incorporated as part of the present disclosure by reference thereto. It is further noted that the cyano-alkyl- and/or cyanoalkoxy-substituted polyalkylsiloxane hydrides shown as reactants in Equations 1 and 2 above are as described and claimed in our said application Ser. No. 279,883 and that the various methods by which they in turn are prepared are also incorporated herein as part of the present disclosure by reference thereto.

Illustrative polymers within the scope of Component B of the admixtures of the present invention are the following polymethylsiloxane-polyoxyalkylene copolymers which are of the class defined by above Formulas II and II–B:

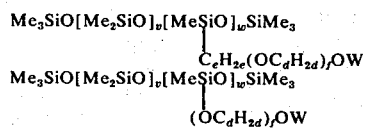

wherein, as previously defined herein: Me is methyl; W is an organic cap; $v$ has an average value from about 10 to about 60; $w$ has an average value from about 2 to about 10; $e$ has a value from 2 to 6; $d$ has a value from 2 to 4 provided from about 20 to about 75 weight percent of the polyoxyalkylene chain, $-(OC_dH_{2d})_f-$, is constituted of oxyethylene; and $f$ has an average value such that the average molecular weight of the polyoxyalkylene chain is from about 800 to about 6000 and is preferably no more than about 4000. Further illustrative copolymers suitable for use as Component B of the admixtures of this invention are those copolymers described in U.S. Pat. No. 3,505,377, now U.S. Pat. No. Re. 27,541, having from 40 to 60 dialkylsiloxy units and which otherwise are within the parameters described herein for Component B.

The non hydrolyzable polymers illustrated by Formula II–B–1 are prepared by conventional platinum-catalyzed hydrosilation reactions between corresponding equilibrated polymethylsiloxane hydrides (or, with reference to general Formula II–B equilibrated polyalkylsiloxane hydrides) and corresponding monoolefinic polyoxyalkylene ether reactants, $WO(C_dH_{2d}O)_fC_eH_{2e-1}$. The hydrolyzable polymers illustrated by Formula II–B–2 are prepared by conventional catalyzed condensation reactions (Si—H/—OH) between such hydrides and hydroxyl-terminated polyoxyalkylene ethers, $W(OC_dH_{2d})_fOH$.

Further illustrative copolymers within the scope of Component B of the admixtures of the present invention are the following polymethylsiloxane-polyoxyalkylene copolymers which are of the class discussed above with reference to expression III:

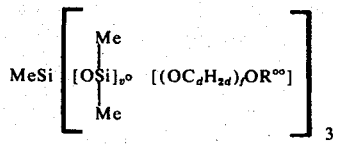

wherein: Me is methy; $v°$ has an average value from about 3 to about 20; $d$ has a value from 2 to 4 provided from about 20 to about 75 weight percent of the polyoxyalkylene chain is constituted of oxyethylene; $f$ has an average value such that the average molecular weight of the chain is between about 800 and about 6000 and is preferably no more than about 4000; and $R°°$ is a monovalent hydrocarbon cap. As previously discussed, polymers of this type also contain residual silicon-bonded alkoxy groups which are usually ethoxy derived from methyl triethoxysilane employed in their preparation. Methods for their preparation are known to the art and are described, for example, in U.S. Pat. No. 2,834,748.

In a preferred embodiment of the polymers encompassed by Component B of the admixtures of this invention, the polyoxyalkylene block, $-(OC_dH_{2d})_fOW$, is comprised of an admixture of Units X and Y of the formula, $-(OC_2H_4(_{n°}\ (OC_3H_6)_{m°}\ OW$, wherein the values of $n°$ and $m°$ are determined by the following conditions prevailing for Units X and Y:

Unit X represents from about 50 to about 95 weight percent, based on the total weight of Units X and Y in said admixture thereof, of low molecular weight poly(oxyethylene-oxypropylene) copolymers having an average molecular weight from about 800 to about 3000 and wherein from about 20 to about 75 weight percent of the oxyalkylene groups are oxyethylene, the remainder of the oxyalkylene groups being oxypropylene;

Unit Y represents from about 50 to about 5 weight percent, based on the total weight of Units X and Y in said admixture thereof, of a higher molecular weight poly(oxyethylene-oxypropylene) copolymer having an average molecular weight from about 1600 to about 6000 and wherein from about 20 to about 75 weight percent of the oxyalkylene groups are oxyethylene, the remainder of the oxyalkylene groups being oxypropylene; provided the said admixture of Units X and Y has an average molecular weight no higher than about 6000.

In a preferred embodiment of said admixture of Units X and Y, Unit X represents from about 60 to about 90 weight percent of low molecular weight poly(oxyethylene-oxypropylene) copolymer having an average molecular weight from about 1400 to about 2500, and Unit Y constitutes from about 40 to about 10 weight percent of higher molecular weight poly(oxyethylene-oxypropylene) copolymers having an average molecular weight from about 2500 to about 3500, and the average molecular weight of the admixture is no higher than about 4000, the oxyethylene content of respective Units X and Y being as aforesaid. Most preferably, the average molecular weight of Unit X is no higher than about 2200.

In providing polyalkylsiloxane-poly(oxyethylene-oxypropylene) copolymers encompassed by Component B of the foam stabilizing surfactants of the present invention, wherein the polyoxyalkylene block constitutes the aforesaid Units X and Y, a mixture of respective corresponding polyether reactants is hydrosilated or condensed with the aforementioned equilibrated polyalkylsiloxane hydrides, depending on whether it is desired to provide an Si—C or Si—O—C linkage between the polysiloxane and polyoxyalkylene blocks. It is to be understood that said mixture of polyether reactants is such that one polyether reactant has an average molecular weight corresponding to that of Unit X and the other has an average molecular weight corresponding to that of Unit Y, the oxyalkylene content of said polyethers being constituted of from about 20 to about 75 weight percent of oxyethylene, the said polyether reactants being employed in relative amounts to satisfy the above-defined relative proportions of Units X and Y in the polyoxyalkylene block of the final Component B product. In regard to the Component B copolymers of the non hydrolyzable type such as those illustrated by above Formula II–B–1, it is especially preferred to employ an alkenyl-capped mixture of the said polyether reactants which have been prepared by starting the respective ethylene oxide-propylene oxide copolymerization with a hydroxyl-containing compound, $R^{\circ\circ}$—OH (wherein $R^{\circ\circ}$— is as previously defined herein) such as alkanols (e.g., methanol, ethanol and butanol), phenols and aralkyl alcohols (e.g., benzyl alcohol). The capping of the mixture of the $R^{\circ\circ}$—OH started, hydroxy-terminated polyethers, with an alkenyl group ($-C_eH_{2e-1}$) which is usually allyl, is effected by conventional methods. For example, the hydroxyl-terminated polyethers can be reacted with an alkali metal alkoxide such as sodium methoxide, to produce their corresponding alkali metal salts which are then reacted in admixture with an alkenyl halide such as allyl chloride, to provide the desired alkenyl-capped mixture of polyether reactants. It is to be understood, however, that the Component B copolymers illustrated by Formula II–B–1 wherein the polyoxyalkylene blocks contain an admixture of said Units X and Y can also be derived from polyether reactants prepared by starting the ethylene oxide-propylene oxide copolymerization with an alkenol such as allyl alcohol, followed by capping of the terminal hydroxyl group in the same manner using $R^{\circ\circ}$—Cl compounds such as alkyl, aryl or aralkyl halides, or by esterifying the terminal hydroxyl group with an acyl compound (e.g., acetic anhydride), or by reacting the —OH with an isocyanate or by other known reactions, to provide corresponding alkyl, aryl, aralkyl, acyl or carbamate caps.

In regard to the Component B copolymers of the hydrolyzable type such as those illustrated by above Formulas II–B–2 and III–B wherein the block, —$(OC_dH_{2d})_f$— is formed of the above-defined Units X and Y, the respective polyether reactants are $R^{\circ\circ}$—OH started and a mixture of the respective hydroxyl-terminated polyethers is reacted with an appropriate polyalkylsiloxane.

It is to be understood that the cyano-bearing polysiloxane-polyoxyalkylene copolymers within the scope of Component A of the admixtures of the present invention may be in combination with one or more types of polyalkylsiloxane-polyoxyalkylene polymers within the scope of Component B, provided the admixture contains from about 10 to about 90 weight percent of Component A and from about 90 to about 10 weight percent of total Component B polymers, based on the combined weight of Components A and b in the admixture. Usually, the admixtures contain from about 20 to about 90 weight percent of Component A and correspondingly from about 80 to about 10 weight percent of Component B. From the standpoint of providing the most desirable overall results and versatility as the foam stabilizing components of a wide variety of flexible foam formulations including formulations having low and high density specifications, it is preferred that the admixtures of the invention contain a minor amount of Component B, that is, less than 50 weight percent such as no more than about 45 weight percent, based on the combined weight of A and B in the admixture. Most preferably, particularly for use in stabilizing high density foam, the admixtures of the invention contain from about 65 to about 85 weight percent of Component A and correspondingly from about 35 to about 15 weight percent of Component B.

The respective polymers defined herein as Component A and Component B are normally liquid compositions and comprise mixtures of polymer species which differ in molecular weight, polyether and siloxane contents and relative number of monomeric units. It is to be understood, therefore, that as expressed herein, the values of these parameters are average values. It also is to be understood that a small percentage (on the average, usually about 10 mole percent or less) of the polyoxyalkylene blocks may comprise residual, uncapped hydroxyl-terminated groups introduced with the polyoxyalkylene ether reactants.

The admixtures of Component A and Component B provided by the present invention can be employed as a 100 percent active stream or in dilute form as a solution in various types of organic liquids including polar and non polar solvents. For example, the admixtures may be diluted with non polar solvents such as the normally liquid aliphatic and aromatic unsubstituted and halogensubstituted hydrocarbons such as heptane, xylene, toluene, chlorobenzene and the like. When used, the preferred diluents are polyoxyalkylene compounds encompassed by the formula:

$ZO(Z'O)_tZ''$ wherein:

Z is hydrogen or a monovalent hydrocarbon group including alkyl (e.g., methyl, ethyl, propyl and butyl), aryl (e.g., phenyl and tolyl) and aralkyl (e.g., benzyl) groups;

Z' is a bivalent alkylene group (e.g., ethylene, propylene, trimethylene and butylene);

Z'' is a monovalent hydrocarbon group such as defined for Z; and $t$ has an average value of at least two. When Z is hydrogen, it is preferred that such ZO groups (that is, —OH) represent no more than about 5 weight percent of the solvent. Suitable solvents are alkylene oxide adducts of starters such as water, monools, diols and other polyols. Such organic starters are typically illustrated by butanol, propylene glycol, glycerol and 1,2,6-hexantriol. Preferred adducts of the organic starters are the mixed alkylene oxide adducts, particularly those containing a combination of oxyethylene and oxypropylene units. For example, one class of such organic solvents which may be present in combination with Components A and B of the admixtures of the present invention are mixed ethylene oxide-propylene oxide adducts of butanol which are represented by the general formula, $HO(C_2H_4O)_s(C_3H_6O)_uC_4H_9$, wherein $s$ has an average value from about 8 to about 50, and $u$ has an average value from about 6 to about 40. Preferably, the values of $s$ and $u$ are such that the weight percent of oxyethylene units is about equal to the weight percent of the oxypropylene units.

When used, the aforesaid diluents are usually present in the admixtures of the invention in an amount from about 1 to about 60 weight percent, based on the combined weight of Component A and Component B contained in the resulting solution. More usually, when such diluents are present, they are contained in the solution in an amount from about 5 to about 45 weight percent, again based on the combined weight of Components A and B contained therein. It is to be understood, however, that such solutions may have higher contents of diluent and that the extent of dilution, if any, depends largely on the activity specifications of any given foam formulation.

The admixtures of Components A and B of the present invention may also be used in combination with non ionic organic surfactants such as adducts produced by reacting $k$ moles of ethylene oxide (wherein $k$ has an average value from about 4 to about 40, inclusive of whole and fractional numbers) per mole of any of the following hydrophobes: n-undecyl alcohol, myristyl alcohol, lauryl alcohol, trimethyl nonanol, tridecyl alcohol, pentadecyl alcohol, cetyl alcohol, nonylphenol, dodecylphenol, tetradecylphenol and the like. Especially useful are ethylene oxide adducts of nonylphenol having the average composition, $C_9H_{19}$—$C_6H_4$—$(OC_2H_4)_hOH$, wherein $h$ has an average value from about 9 up to about 20 or more, including whole and fractional numbers such as 9, 10.5, 13, 14.5 and 15. When used, such non ionic organic surfactants are used in amounts from about 2 to about 20 weight percent, based on the combined weight of Components A and B in any given admixture.

In addition to the surfactant compositions comprising the respective copolymers encompassed by Components A and B, the other essential types of components and reactants employed in providing flexible polyurethane foams as described herein are polyether polyols, organic polyisocyanates, the catalyst system and blowing agent, and, when producing flame-retarded foams, the foam-producing reaction mixture also contains a flame-retardant. The admixture of Components A and B of the present invention is usually present in the final foam-producing reaction mixtures in amounts of from about 0.1 to about 5 parts by weight (expressed on the basis of the combined weight of polymeric Components A and B, exclusive of any diluent or other additive which may be present in the admixture) per 100 parts by weight of the polyether polyol reactant.

In producing the flexible polyurethane polymers of the present invention, one or more polyether polyols is employed for reaction with the polyisocyanate reactant to provide the urethane linkage. Such polyols have an average of at least two, and usually not more than six, hydroxyl groups per molecule and include compounds which consist of carbon, hydrogen and oxygen and compounds which also contain phosphorus, halogen and/or nitrogen.

Among the suitable polyether polyols that can be employed are the poly(oxyalkylene) polyols, that is, alkylene oxide adducts of water or a polyhydric organic compound as the initiator or starter. For convenience, this class of polyether polyols is referred to herein as Polyol I. Illustrative of suitable polyhydric organic initiators are any one of the following which may be employed individually or in combination: ethylene glycol; diethylene glycol; propylene glycol; 1,5-pentanediol; hexylene glycol; dipropylene glycol; trimethylene glycol; 1,2-cyclohexanediol; 3-cyclohexane-1,1-dimethanol and dibromo-derivative thereof; glycerol; 1,2,6-hexanetriol; 1,1,1-trimethyolethane; 1,1,1-trimethyolpropane; 3-(2-hydroxyethoxy)- and 3-(2-hydroxypropoxy)-1,2-propanediols; 2,4-dimethyl-2-(2-hydroxyethoxy)methylpentanediol-1,5; 1,1,1-tris[(2-hydroxyethoxy)methyl]ethane; 1,1,1-tris[(2-hydroxypropoxy)methyl]propane; pentaerythritol; sorbitol; sucrose; alpha-methyl glucoside; other such polyhydric compounds consisting of carbon, hydrogen and oxygen and having usually not more than about 15 carbon atoms per molecule; and lower alkylene oxide adducts of any of the aforesaid initiators such as propylene oxide or ethylene oxide adducts having a relatively low average molecular weight up to about 800.

The above-described polyether polyols are normally liquid materials and, in general, are prepared in accordance with well known techniques comprising the reaction of the polyhydric starter and an alkylene oxide in the presence of an oxyalkylation catalyst which is usually an alkali metal hydroxide such as, in particular, potassium hydroxide. The oxyalkylation of the polyhydric initiator is carried out at temperatures ranging from about 90°C. to about 150°C. and usually at an elevated pressure up to about 200 p.s.i.g., employing a sufficient amount of alkylene oxide and adequate reaction time to obtain a polyol of desired molecular weight which is conveniently followed during the course of the reaction by standard hydroxyl number determinations. As is well known to this art, the hydroxyl numbers are determined by, and are defined as, the number of milligrams of potassium hydroxide required for the complete neutralization of the hydrolysis product of the fully acetylated derivative prepared from 1 gram of polyol or mixture of polyols. The hydroxyl number is also defined by the following equation which indicates its relationship with the molecular weight and functionality of the polyol:

$$OH = \frac{56.1 \times 1000 \times f}{M.W.}$$

wherein
OH = hydroxyl number of the polyol,
$f$ = average functionality, that is, the average number of hydroxyl groups per molecule of polyol, and
M.W. = average molecular weight of the polyol.

The alkylene oxides usually employed in providing the polyether polyol reactants are the lower alkylene oxides, that is, compounds having from 2 to 4 carbon atoms including ethylene oxide, propylene oxide, butylene oxides (1,2- or 2,3-) and combinations thereof. When more than one type of oxyalkylene unit is desired in the polyol product, the alkylene oxide reactants may be fed to the reaction system sequentially to provide polyoxyalkylene chains containing respective blocks of different oxyalkylene units or they may be fed simultaneously to provide substantially random distribution of units. Alternatively, the polyoxyalkylene chains may consist essentially of one type of oxyalkylene unit such as oxypropylene capped with oxyethylene units.

A second class of polyether polyols that are suitable for use in preparing the flexible polyurethane foams of the present invention are polymer/polyether polyols which, for convenience, are referred to herein as Polyol II. Such reactants are produced by the polymerizing one or more ethylenically unsaturated monomers dissolved or dispersed in a polyether polyol in the presence of a free radical catalyst. Suitable polyether polyols for producing such compositions include, for example, any of the above-described polyols encompassed by the definition of Polyol I. Illustrative of suitable ethylenically unsaturated monomers are those encompassed by the general formula,

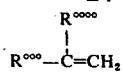

where: $R^{\circ\circ\circ}$ is hydrogen, methyl or any of the halogens (i.e., fluorine, chlorine, bromine or iodine); and $R^{\circ\circ\circ\circ}$ is $R^{\circ\circ\circ}$, cyano, phenyl, methyl-substituted phenyl, or alkenyl radicals having from 2 to 6 carbon atoms such as vinyl, allyl and isopropenyl groups. Typical examples of such polymerizable monomers are the following which may be employed individually or in combination: ethylene, propylene, acrylonitrile, methacrylonitrile, vinyl chloride, vinylidene chloride, styrene, alpha-methylstyrene, and butadiene. These and other polymer/polyol compositions which are suitably employed either individually or in combination with Polyol I are those described in British Patent 1,063,222 and U.S. Pat. No. 3,383,351, the disclosures of which are incorporated herein by reference thereto. Such compositions are prepared by polymerizing the monomers in the polyol at a temperature between about 40°C. and about 150°C. employing any free radical-generating initiator including peroxides, persulfates, percarbonates, perborates, azo compounds such as, for example, hydrogen peroxide, dibenzoyl peroxide, benzoyl hydroperoxide, lauroyl peroxide, and azobis(isobutyronitrile). The polymer/polyether polyol product may also contain a small amount of unreacted polyether, monomer and free polymer.

When used in the practice of this invention, the polymer/polyol compositions usually contain from about 5 to about 50, and more usually from about 10 to about 40, weight percent of the ethylenically unsaturated monomer polymerized in the polyether polyol. Especially suitable polymer/polyols are those containing:

(A) from about 10 to about 30 weight percent of a copolymer of (1) acrylonitrile or methacrylonitrile, and (2) styrene or alpha-methylstyrene, the said copolymer containing from about 50 to 75 and from about 50 to 25 weight percent of (1) and (2), respectively; and (B) from about 90 about 70 weight percent of the polyether polyol, and particularly trifunctional polyols such as alkylene oxide adducts of glycerol.

In preparing polyurethane foams in accordance with the present invention, it is to be understood that mixtures of any of the aforesaid polyether polyols encompassed by Polyol I and Polyol II can be employed as reactants with the organic polyisocyanate. The particular polyether polyol or polyols employed depends upon the end-use of the polyurethane foam. Usually diols provide soft foams, firmer foams are obtained by the incorporation of polyether polyols having more than two hydroxyl groups, including triols, tetraols, pentols and hexols. When it is desired to produce polyurethanes having comparatively high load-bearing properties and/or diecutability, polymer/polyether polyols of the aforesaid type are used.

The hydroxyl number of the polyether polyol reactant including mixtures of polyols employed in the production of the flexible polyurethane foams of this invention may vary over a relatively wide range such as from about 28 to about 150, and is usually no higher than about 80.

The polyisocyanates used in the manufacture of polyurethanes are known to the art and any such reactants are suitably employed in producing the flexible polyether-based polyurethane foams of the present invention. Among such suitable polyisocyanates are those represented by the general formula:

$$Q'(NCO)_i$$

wherein: $i$ has an average value of at least two and is usually no more than six, and $Q'$ represents an aliphatic, cycloaliphatic or aromatic radical which can be an unsubstituted hydrocarbyl group or a hydrocarbyl group substituted, for example, with halogen or alkoxy. For example, $Q'$ can be an alkylene, cycloalkylene, arylene, alkyl-substituted cycloalkylene, alkarylene or aralkylene radical including corresponding halogen- and alkoxy-substituted radicals. Typical examples of polyisocyanates for use in preparing the polyurethanes of this invention are any of the following including mixtures thereof: 1,6-hexamethylene diisocyanate, 1,4-tetramethylene diisocyanate, 1-methyl-2,4-diisocyanatocyclohexane, bis(4-isocyanatophenyl)methane, phenylene diisocyanates such as 4-methoxy-1,4-phenylenediisocyanate, 4-chloro-1,3-phenylenediisocyanate, 4-bromo-1,3-phenylenediisocyanate, 5,6-dimethyl-1,3-phenylenediisocyanate, 2,4-tolylene diisocyanate, 2,6-tolylene diisocyanate, crude tolylene diisocyanates, 6-isopropyl-1,3-phenylenediisocyanate, durylene diisocyanate, triphenylmethane-4,4',4''-triisocyanate, and other organic polyisocyanates known to the polyurethane art. Other suitable polyisocyanate reactants are ethylphosphonic diisocyanate and phenylphosphonic diisocyanate. Of the aforesaid types of polyisocyanates, those containing aromatic nuclei are generally preferred.

Also useful as the polyisocyanate reactant are polymeric isocyanates having units of the formula:

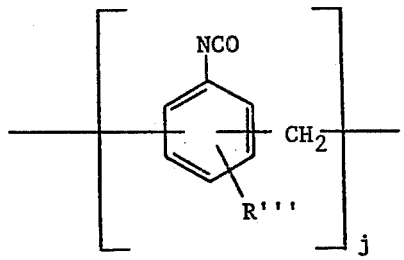

wherein $R'''$ is hydrogen and/or lower alkyl and $j$ has an average value of at least 2.1. Preferably the lower alkyl radical is methyl and $j$ has an average value of from 2.1 to about 3.0. Particularly useful polyisocyanates of this type are the polyphenylmethylene polyisocyanates produced by phosgenation of the polyamine obtained by acid-catalyzed condensation of aniline with formaldehyde. Polyphenylmethylene polyisocyanates of this type are available commercially under such trade names as PAPI, NIAX Isocyanate AFPI, Mondur MR, Isonate 390P, NCO–120, Thanate P–220, NCO–10 and NCO–20. These products are low viscosity (50–500 centipoises at 25°C.) liquids having average isocyanato functionalities in the range of about 2.25 to about 3.2 or higher, depending upon the specific aniline-to-formaldehyde molar ratio used in the polyamine preparation.

Other useful polyisocyanates are combinations of diisocyanates with polymeric isocyanates containing more than two isocyanate groups per molecule. Illustrative of such combinations are: a mixture of 2,4-tolylene diisocyanate, 2,6-tolylene diisocyanate and the aforesaid polyphenylmethylene polyisocyanates and/or polymeric tolylene diisocyanates obtained as residues from the manufacture of the diisocyanates.

On the combined basis, the polyether polyol and organic polyisocyanate usually constitute the major proportion by weight of the polyurethane-forming reaction mixture. In general, the polyisocyanate and polyether polyol reactants are employed in relative amounts such that the ratio of total —NCO equivalents to total active hydrogen equivalent (of the polyether polyol and any water, when used) is from 0.8 to 1.5, preferably from 0.9 to 1.1, equivalents of —NCO per equivalent of active hydrogen. This ratio is known as the Isocyanate Index and is often also expressee as a percent of the stoichiometric amount of polyisocyanate required to react with total active hydrogen. When expressed as a percent, the Isocyanate Index may be from 80 to 150, and is preferably within the range from about 90 to about 110.

The urethane-forming reaction is effected in the presence of a minor amount of a catalyst comprising an amine. This component of the polyurethane-forming reaction mixture is usually a tertiary amine. Suitable amine catalysts include one or more of the following: N-methylmorpholine; N-ethylmorpholine; N-octadecylmorpholine; triethylamine; tributylamine, trioctylamine; N,N,N',N'-tetramethylethylenediamine; N,N,N',N'-tetramethyl-1,3-butanediamine; triethanolamine; N,N-dimethylethanolamine; triisopropanolamine; N-methyldiethanolamine; hexadecyldimethylamine; N,N-dimethylbenzylamine; trimethylamine; N,N-dimethyl-2-(2-dimethylaminoethoxy)ethylamine, also known as bis(2-dimethylaminoethyl)ether; triethylenediamine (i.e., diazabicyclo[2.2.2]octane); the formate and other salts of triethylenediamine, oxyalkylene adducts of the amino groups of primary and secondary amines and other such amine catalysts which are well known in the art of polyurethane manufacture. Also useful are the beta-tertiary amino amides and esters described in U.S. Pat. No. 3,821,131, as exemplified by 3-dimethylamino-N,N-dimethylpropionamide. Also useful as the amine catalyst are the beta-tertiary-amino nitriles described in copending application Ser. No. 369,556, filed June 13, 1973, of W. R. Rosemund, M. R. Sandner and D. J. Trecker, as exemplified by 3-dimethylaminopropionitrile as such or in combination with other tertiary amines such as bis[2-(N,N-dimethylamino)ethyl]ether. The amine catalyst may be introduced to the polyurethane-producing reaction mixture as such or as a solution in suitable carrier solvents such as diethylene glycol, dipropylene glycol, and 2-methyl-2,4-pentanediol ("hexylene glycol").

The amine catalyst is present in the final urethane-producing reaction mixture in an amount of from about 0.05 to about 3 parts by weight of active catalyst (that is, the amine exclusive of other components present in solutions thereof) per 100 parts by weight of the polyether polyol reactant.

In producing polyurethanes from polyether polyols usual practice is to include as a further component of the reaction mixture a minor amount of certain metal catalysts which are useful in promoting gellation of the foaming mixture. Such supplementary catalysts are well known to the art of flexible polyether-based polyurethane foam manufacture. For example, useful metal catalysts include organic derivatives of tin, particularly tin compounds of carboxylic acids, such as stannous octoate, stannous oleate, stannous acetate, stannous laurate, dibutyl tin dilaurate, and other such tin salts. Additional metal catalysts are organic derivatives of other polyvalent metals such as zinc and nickel (e.g., nickel acetylacetonate). In general, the amount of such metal co-catalysts which can be present in the polyurethane-producing reaction mixture is within the range from about 0.05 to about 2 parts by weight per 100 parts by weight of the polyether polyol reactant.

Foaming is accomplished by the presence in the reaction mixture of varying amounts of a polyurethane blowing agent such as water which, upon reaction with isocyanate generates carbon dioxide in situ, or through the use of blowing agents which are vaporized by the exotherm of the reaction, or by a combination of the two methods. These various methods are known in the art. Thus, in addition to or in place of water, other blowing agents which can be employed include methylene chloride, liquefied gases which have boiling points below 80°F. and above −60°F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Fluorocarbon blowing agents suitable for use in foaming the formulations of this invention include trichlorofluoromethane, dichlorodifluoromethane, 1,1-dichloro-1-fluoroethane, 1,1,1-trifluoro-2-fluoro-3,3-difluoro-4,4,4-trifluorobutane, hexafluorocyclobutene and octafluorocyclobutane. The generally preferred method of foaming for producing flexible foams is the use of water or a combination of water plus a fluorocarbon blowing agent such as trichlorofluoromethane.

The amount of blowing agent employed will vary with factors such as the desired density of the foamed product. Usually, however, from about 1 to about 30 parts by weight of the blowing agent per 100 parts by weight of the polyether polyol reactant is preferred. Foam densities may be within the range from about 0.8 to about 5 pounds per cubic foot (pcf). Polyurethane foam of relatively low density such as 2 pcf and less is usually prepared employing blowing agent comprising water in an amount of at least about 3 parts by weight per 100 parts by weight of polyether polyol reactant, whereas higher density foam is provided at lower levels of water with and without the use of an auxiliary fluorocarbon blowing agent. It is to be understood, however, that these are general guidelines and that the choice of the particular amount of blowing agent employed to obtain a desired foam density specification varies from formulation to formulation and is well within the skill of the art to which the present invention pertains.

The organic flame-retardants that can be employed in producing flame-retarded flexible polyether foams in accordance with the teachings of this invention can be chemically combined in one or more of the other materials used (e.g., in the polyether polyol or polyisocyanate), or they can be used as discrete chemical compounds added as such to the foam formulation. The organic flame-retardants preferably contain phosphorus or halogen, or both phosphorus and halogen. Usually, the halogen, when present, is chlorine and/or bromine. Flame-retardants of the discrete chemical variety include: 2,2-bis(bromomethyl)-1,3-propanediol (also known as dibromoneopentyl glycol); 2,3-dibromopropanol, tetrabromophthalic anhydride; brominated phthalate ester diols such as those produced from tetrabromophthalic anhydride, propylene oxide and propylene glycol; tetrabromo-bisphenol-A; 2,4,6-tribromophenol; pentabromophenol; brominated anilines and dianilines; bis(2,3-dibromopropyl)ether of sorbitol; tetrachlorophthalic anhydride; chlorendic acid; chlorendic anhydride; diallyl chlorendate; chlorinated maleic anhydride; tris(2-chloroethyl)phosphate [(ClCH$_2$CH$_2$O)$_3$P(O)]; tris(2,3-dibromopropyl)phosphate; tris(1,3-dichloropropyl)phosphate; tris(1-bromo-3-chloroisopropyl)phosphate; bis(2,3-dibromopropyl) phosphoric acid or salts thereof; oxypropylated phosphoric and polyphosphoric acids; polyol phosphites such as tris(dipropylene glycol)phosphite; polyol phosphonates such as bis(dipropylene glycol)hydroxymethyl phosphonate; di-poly(oxyethylene)hydroxymethyl phosphonate; di-poly(oxypropylene)phenyl phosphonate; di-poly(oxypropylene)chloromethyl phosphonate; di-poly(oxypropylene)butyl phosphonate; and O,O-diethyl-N,N-bis(2-hydroxyethyl)aminomethyl phosphonate. Also suitable are compounds having the formulas:

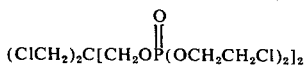

and

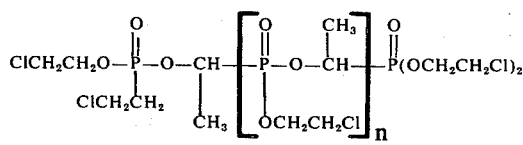

which are available from Monsanto Chemical Company under the names Phosgard 2XC–20 and Phosgard C–22–R, respectively. Other suitable flame-retardants comprise halogen-containing polymeric resins such as polyvinylchloride resins in combination with antimony trioxide and/or other inorganic metal oxides such as zinc oxide, as described in U.S. Pat. Nos. 3,075,927; 3,075,928; 3,222,305; and 3,574,149. It is to be understood that other flame-retardants known to the art may be used and that the aforesaid compounds may be employed individually or in combination with one another.

Those of the above flame-retardants of the discrete chemical compound variety which contain groups reactive with hydroxyl or isocyanato groups can be used as reactants in producing the polyether polyol reactant or they can be reacted with organic polyisocyanates, to produce modified polyols or polyisocyanates having chemically combined flame-retarding groups. Such modified polyether polyols and polyisocyanates are also useful as reactants in the process of this invention. In such cases, due regard must be given to the possible effect of the functionality of the compound on the other properties (e.g., degree of flexibility) of the resulting foam.

The flame-retarding agent can be used in an amount from about 1 to about 30 parts by weight per 100 parts by weight of the polyether polyol reactant, and is usually employed in an amount of at least about 5 parts by weight. It is evident that the particular amount of flame-retardant employed depends largely on the efficiency of any given agent in reducing flammability.

The polyether-based polyurethane foams of this invention may be formed in accordance with any of the processing techniques known to the art such as, in particular, the "one-shot" technique. In accordance with this method, foamed products are provided by carrying out the reaction of the polyisocyanate and polyether polyol simultaneously with the foaming operation. It is sometimes convenient to add the foam stabilizing component comprising the admixture of polymeric Components A and B of the present invention, to the reaction mixture as a premixture with one or more of the blowing agent, polyether polyol, amine catalyst and, when used, the flame-retardant. It is to be understood that the relative amounts of the various components of the foam formulations are not narrowly critical. The polyether polyol and polyisocyanate are present in the foam-producing formulation in a major amount. The relative amounts of these two components is the amount required to produce the urethane structure of the foam and such relative amounts are well known in the art. The source of the blowing action such as water, auxiliary blowing agents, amine catalyst, metal co-catalyst and the foam stabilizing admixtures of the present invention are each present in a minor amount necessary to achieve the function of the component. Thus, the blowing agent is present in an amount sufficient to foam the reaction mixture, the amine catalyst is present in a catalytic amount (i.e., an amount sufficient to catalyze the reaction to produce the urethane at a reasonable rate), and the admixture of Components A and B of this invention is present in a foam-stabilizing amount, that is, in an amount sufficient to stabilize the foam. The preferred amounts of these various components are as given hereinabove.

If desired, other additional ingredients can be employed in minor amounts in producing the polyurethane foams in accordance with the process of this invention. Illustrative of such additives that can be employed are: cross-linking agents such as glycerol, triethanolamine and their oxyalkylene adducts, as well as fillers, dyes, pigments, anti-yellowing agents and the like. The polyurethanes produced in accordance with the present invention are used in the same areas as conventional flexible polyether polyurethanes and are especially useful where improved fire-resistance properties are beneficial. Thus, the foams of the present invention are used with advantage in the manufacture of textile interliners, cushions, mattresses, paddings, carpet underlay, packaging, gaskets, sealers, thermal insulators and the like.

The following examples are merely illustrative of the present invention and are not intended as a limitation upon the scope thereof.

In the examples and comparative runs which follow various organosilicone compositions comprising a cyanopropylmodified polysiloxane-polyoxyalkylene polymer within the scope of Component A and/or a polymethylsiloxane-polyoxyalkylene polymer within the scope of Component B, were evaluated as the surfactant component, that is, the foam stabilizing component, of a variety of foam-producing reaction mixtures designed to provide low and high density foam including flame-retarded foam. These various reaction mixtures are referred to herein as Foam Formulations A through D. The components and relative proportions of components in said reaction mixtures are as indicated in the following Tables I through IV, respectively.

TABLE I

FOAM FORMULATION A

| Components | Parts By Weight |
|---|---|
| Polyether Polyol having a Hydroxyl Number of about 46 produced by reacting glycerol, propylene oxide and ethylene oxide. | 100 |
| Tolylene Diisocyanate (Index 105) (1) | 48.4 |
| Water | 4.0 |
| Bis[2-(N,N-dimethylamino)ethyl] ether employed as a 70 weight percent solution in dipropylene glycol | 0.1 |
| Stannous Octoate | 0.2 |
| Flame-Retardant (2) | 5.0 |
| Surfactant | Varied |

(1) This component was a mixture of the 2,4- and 2,6- isomers of tolylene diisocyanate present in a weight ratio of 80:20, respectively. Index 105 designates that the amount of mixture employed was 105 weight percent of the stoichiometric amount required to react with total reactive hydrogens from the polyether polyol and water present in the foam formulation.
(2) Tris(2,3-dibromopropyl)phosphate which has the formula, $(BrCH_2CHBrCH_2)_3P(O)$, and is also known as Firemaster LV-T23P (Michigan Chemical Company).

TABLE II

FOAM FORMULATION B

| Components | Parts By Weight |
|---|---|
| Polyether Triol having an average molecular weight of about 5000, a Hydroxyl No. of about 34, and a primary hydroxyl content of about 75 mole percent, derived from glycerol, ethylene oxide and propylene oxide. | 100 |
| Tolylene Diisocyanate (Index 105) (1) | 27.4 |
| Blowing Agent | |
| Water | 2.15 |
| Trichlorofluoromethane | 3.0 |
| Bis[2-(N,N-dimethylamino)ethyl]ether employed as a 70 weight per cent solution in dipropylene glycol | 0.1 |
| Flame-Retardant (2) | 3 |
| Surfactant | 0.75 |
| Stannous Octoate | Varied |

(1) This component was a mixture of the 2,4- and 2,6-isomers of tolylene diisocyanate present in a weight ratio of 65:35, respectively. Index 105 has the same significance indicated in footnote 1 of Table I.
(2) Tris(2,3-dibromopropyl)phosphate.

TABLE III

FOAM FORMULATION C

| Component | Parts By Weight |
|---|---|
| Polyether Polyol having a Hydroxyl No. of about 46, produced from glycerol dipropylene glycol, propylene oxide and ethylene oxide. | 100 |
| Tolylene Diisocyanate (1) | 48.4 |
| Water | 4 |
| Bis[2-(N,N-dimethylamino)ethyl]ether employed as a 70 weight percent solution in dipropylene glycol | 0.1 |
| Stannous octoate | 0.25 |
| Surfactant | 1 |
| Flame-Retardant (2) | 10 |

(1) As defined in Table I.
(2) Tris(2,3-dichloropropyl)phosphate.

TABLE IV

FOAM FORMULATION D

| Component | Parts By Weight |
|---|---|
| Polyether Polyol (1) | 100 |
| Tolylene Diisocyanate | Index 105 |
| Blowing Agent | |
| Water | 4.85 |
| Trichlorofluoromethane | 15.0 |
| Dimethylethanolamine | 0.35 |
| Stannous octoate | 0.3 |
| Surfactant | 0.6 |

(1) As defined in Table III.

General Foaming Procedure

Except as noted, the foams of the examples and comparative runs were prepared employing substantially the same procedure which entailed the following manipulative steps: After dispensing the polyether polyol reactant in a container, the flame-retardant (when used) is added thereto and dispersed therein with a spatula. The surfactant is then added from a syringe and is also dispersed with a spatula. After inserting a baffle, a premixture of the amine catalyst and blowing agent is added but not dispersed. The resulting blend is then placed in a drill press and the mixture agitated 15 seconds at 2000 revolutions per minute. Agitation is then stopped and the stannous octoate co-catalyst is added from a syringe. Agitation is continued for an additional 8 seconds, after which the diisocyanate reactant is added rapidly and the agitation is continued for another 7 seconds. After the mixing cycle, the mixture is poured into a parchment-lined container (12 × 12 × 12 inches when employing Foam Formulations A and B; 12 × 12 × 8 inches when employing Foam Formulations C and D supported by a wooden mold. The foam is allowed to rest in the container for at least 3 minutes and is then cured in an oven for 10–15 minutes at 130°C. After cutting, the height of the foam rise is measured, and foam samples are prepared for breathability and burning extent determinations.

"Breathability" denotes the porosity of a foam and is roughly proportional to the number of open cells in a foam. As reported herein, breathability was determined in accordance with the NOPCO test procedure described by R. E. Jones and G. Fesman, "Journal of Cellular Plastics" (January, 1965), as follows: A 2 inch × 2 inch × 1 inch piece of foam is cut from near the center of the bun. Using a Nopco Foam Breathability Tester, Type GP-2 Model 40GD10, air is drawn through the foam sample at a pressure differential of 0.5 inches of water less than atmospheric pressure. The air flow is parallel to the direction of original foam rise. The degree of openness of the foam (or foam breathability) is measured by the rate of air flow through the foam and is reported in standard cubic feet per minute (SCFM).

"Burning Extent" was determined in accordance with standard flammability test procedure ASTM D-1692-68, except that five test specimens of foam were used instead of ten. Burning extent denotes the burned length (in inches) of the foam and is reported as the average of the results obtained with the various test specimens of a given foam. On the basis of this test, an average burning extent of less than 5.0 inches qualifies the foam for a self-extinguishing ("SE") rating. When the burning extent of at least one test specimen is 5.0 inches or greater, the foam is assigned a burning ("B") rating and usually no further specimens of that foam are tested.

"Burning Time" denotes the average time (in seconds) taken to give the specified burning extent.

As used herein, the abbreviation "p.h.p." means that the concentration of a particular component of the foam formulation is expressed in parts by weight per 100 parts by weight of the polyether polyol reactant contained in the formulation.

In the examples which follow the surfactant or foam-stabilizing components of the above Formulations A-D are designated Surfactants A-B-1, A-B-2, A-B-3 and A-B-4 which are illustrative of the admixtures of the present invention. In the comparative runs, the surfactant components of the formulations are designated as Surfactants A-1, A-2, A-3, B-1, B-2 and B-3. The compositions of these various surfactants are given in Table V in which the individual polysiloxane-polyoxyalkylene copolymers thereof are referred to as Polymer A, Polymer B and Polymer BB. These latter polymers are in turn identified as follows (wherein Me represents methyl):

Polymer A

This polymer, which is illustrative of the polymers within the scope of Component A of the admixtures of this invention, is a gamma-cyanopropyl-modified polymethylsiloxane-poly(oxyethylene-oxypropylene) block polymer having the average composition,

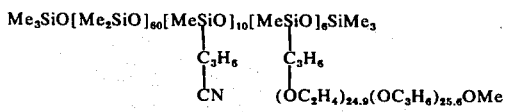

and is prepared by the platinum-catalyzed hydrosilation of allyl alcohol-started, methoxy-capped polyether having the average composition,
$CH_2=CHCH_2(OC_2H_4)_{24.9}(OC_3H_6)_{25.6}OMe$
with a corresponding gamma-cyanopropyl-modified polymethylsiloxane hydride having the average composition,

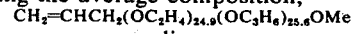

which in turn is prepared as described in our aforesaid copending application Ser. No. 279,883, filed Aug. 11, 1972.

Polymer B

This polymer, which is illustrative of the polymers within the scope of Component B of the admixtures of this invention, is a polymethylsiloxanepoly(oxyethylene-oxypropylene) polymer having the average composition,

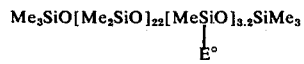

wherein E° comprises a mixture of poly(oxyethylene-oxypropylene) blocks of different average molecular weights linked to silicon through —$C_3H_6$—. The average compositions of the respective blocks are as follows,
—$C_3H_6(OC_3H_6)_{14}(OC_2H_4)_{18.4}OC_4H_9$
—$C_3H_6(OC_3H_6)_{24.3}(OC_2H_4)_{32.1}OC_4H_9$
the indicated moieties being within the scope of respective Units X and Y as defined herein and being present in an amount of 78 and 22 weight percent, respectively, based on their combined weight. Polymer B is prepared by the platinum-catalyzed hydrosilation reaction between an equilibrated polymethylsiloxane hydride fluid having the average composition,

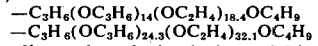

and an allyl-capped mixture of butanol-started poly(oxyethylene-oxypropylene) polyether mono-ols referred to herein as Polyether Mono-ols I and II which have the following respective average compositions, $C_4H_9O(C_2H_4O)_{18.4}(C_3H_6O)_{14}H$      I
$C_4H_9O(C_2H_4O)_{32.1}(C_3H_6O)_{24.3}H$      II the said mixture of mono-ols containing 78 weight percent of I and 22 weight percent of II. Said mixture of mono-ols is allyl capped by converting the mono-ols contained therein to thier corresponding sodium salts followed by reaction with allyl chloride, thereby replacing hydrogen of the terminal hydroxyl groups with allyl (—$CH_2CH=CH_2$).

Polymer BB

This polymer is also illustrative of the polymers within the scope of Component B of the surfactant admixtues of this invention and is a polymethylsiloxane-poly(oxyethylene-oxypropylene) block polymer having the average composition,

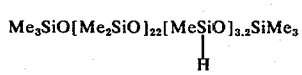

Polymer BB is prepared by the platinum-catalyzed hydrosilation reaction between a corresponding equilibrated polymethylsiloxane hydride fluid and a corresponding allyl alcohol-started, methoxy-capped polyether.

As previously noted, the particular surfactants employed in the examples and comparative runs are identified in the following Table V wherein all references to Polymer A, Polymer B and Polymer BB are to polymeric compositions described immediately above.

TABLE V

| Surfactant Designation | SURFACTANT COMPOSITIONS[1] | | | | | | | | | |
|---|---|---|---|---|---|---|---|---|---|---|
| | A-B-1 | A-B-2 | A-B-3 | A-B-4 | A-1[2] | A-2[2] | A-3[2] | B-1[2] | B-2[2] | B-3[2] |
| Composition of Surfactant | | | | | | | | | | |
| Component A | | | | | | | | | | |
| Polymer A, Wt. % | 75 | 50 | 25 | 65.7 | 100 | 57 | 70 | — | — | — |
| Component B | | | | | | | | | | |
| Polymer B, Wt. % | 25 | 50 | 75 | 20 | — | — | — | 67.3 | — | 100 |
| Polymer BB, Wt. % | — | — | — | — | — | — | — | — | 72.5 | — |

TABLE V-continued

| Surfactant Designation | SURFACTANT COMPOSITIONS[1] | | | | | | | | | |
|---|---|---|---|---|---|---|---|---|---|---|
| | A-B-1 | A-B-2 | A-B-3 | A-B-4 | A-1[2] | A-2[2] | A-3[2] | B-1[2] | B-2[2] | B-3[2] |
| Polyether Mono-ol II[3], Wt. % | — | — | — | 14.3 | — | 43 | 30 | 32.7 | 27.5 | — |

[1]All weight percentages expressed in this Table are based on the combined weight of Component A, Component B and Polyether Mono-ol II when the latter is present as a component of the surfactant. In regard to Surfactant A-B-4 of the invention, the weight percentages of Component A and of Component B, based on their combined weight, exclusive of the weight of Polyether Mono-ol II, are 76.7 and 23.3, respectively. In comparative Surfactants A-2, A-3, B-1 and B-2, the weight percentage of the indicated Component A or Component B polymer, exclusive of Polyether Mono-ol II, is of course 100 percent.
[2]Not surfactant admixtures of the present invention.
[3]Average composition is $C_4H_9O(C_2H_4O)_{32.1}(C_3H_6O)_{24.3}H$.

EXAMPLES 1–6

In accordance with these examples, Surfactants A-B-1, A-B-2 and A-B-3 of the invention were employed as the surfactant component of Foam Formulation A which is of low density foam specification. In Examples 1–3, as well as in comparative Run Nos. C-1 through C-4 in which Surfactants A-1, A-2, B-1 and B-2 were used, the concendtration of the said surfactant (inclusive of Polyether Mono-ol II, when present) was one part per 100 parts by weight of the polyether polyol reactant. In Examples 4–6 and comparative Runs C-5 and C-6, the concentration of the respective surfactants was 0.5 p.h.p. The results of these various flame-retarded, flexible foam preparations are given in Tables VI and VII which follow.

(that is, A-B-1, A-B-2 and A-B-3) wherein Polymer A was in combination with Polymer B, provided flame-retarded flexible foam of lower density. As previously discussed herein, this is a desirable and advantageous result in the formation of low density grade foam in that a greater production of foam per unit volume is realized. It is also noted that, as compared with undiluted Polymer A (that is, Surfactant A-1) employed in comparative Run Nos. C-1 and C-5, the lower density foam products provided with Surfactants A-B-1, A-B-2 and A-B-3 were also of enhanced breathability. Further, although Surfactans B-1 and B-2 (in which Polymers B and BB were the respective sole types of organosilicone component) also provide foams of lower density than the density of the foams produced with Surfactants A-1 and A-2, they tend to provide less open or "tight" flame-retarded foam. The results of Examples 4–6 are

TABLE VI

LOW DENSITY FOAM

| Example No. | — | — | — | — | 1 | 2 | 3 |
|---|---|---|---|---|---|---|---|
| Run No. | C-1 | C-2 | C-3 | C-4 | — | — | — |
| Formulation A (1) | | | | | | | |
| Surfactant (2) | A-1 | A-2 | B-1 | B-2 | A-B-1 | A-B-2 | A-B-3 |
| p.h.p. | 1.0 | 1.0 | 1.0 | 1.0 | 1.0 | 1.0 | 1.0 |
| Cream time, seconds | 12 | 12 | 12 | 12 | 12 | 12 | 12 |
| Rise time, seconds | 91 | 89 | 98 | 98 | 91 | 93 | 95 |
| Height of rise, inches | 6.7 | 6.7 | 6.9 | 6.9 | 6.8 | 6.8 | 6.9 |
| Foam Properties (3) | | | | | | | |
| Density, pcf. | 1.68 | 1.71 | 1.62 | 1.63 | 1.62 | 1.65 | 1.62 |
| Breathability, SCFM | 3.25 | 4.0 | 3.25 | 2.8 | 3.75 | 3.75 | 4.0 |
| Burning extent, inches | 3.2 | 2.4 | 2.5 | 3.3 | 3.4 | 2.7 | 3.0 |
| Burning time, seconds | 41 | 39 | 34 | 48 | 49 | 40 | 44 |

(1) As defined in Table I.
(2) The components of these surfactants are as indicated in Table V.
(3) The cells per inch (CPI) for each foam was 45–50.

TABLE VII

LOW DENSITY FOAM

| Example No. | — | — | 4 | 5 | 6 |
|---|---|---|---|---|---|
| Run No. | C-5 | C-6 | — | — | — |
| Formulation A (1) | | | | | |
| Surfactant (2) | A-1 | B-2 | A-B-1 | A-B-2 | A-B-3 |
| P.h.p. | 0.5 | 0.5 | 0.5 | 0.5 | 0.5 |
| Cream time, seconds | 12 | 12 | 12 | 12 | 12 |
| Rise time, seconds | 87 | 89 | 89 | 89 | 91 |
| Height of rise, inches | 6.6 | 6.9 | 6.6 | 6.9 | 6.8 |
| Foam Properties (3) | | | | | |
| Density, pcf. | 1.68 | 1.64 | 1.65 | 1.63 | 1.64 |
| Breathability, SCFM | 4.75 | 4.75 | 5.25 | 5.25 | 5.0 |
| Burning extent, inches | 2.9 | 3.5 | 2.5 | 2.5 | 2.9 |
| Burning time, seconds | 43 | 54 | 37 | 34 | 42 |

(1) As defined in Table I.
(2) The components of these surfactants are as indicated in Table V.
(3) The cells per inch (CPI) for each foam was 45–50.

Inspection of the results of Talbes VI and VII show that, as compared with Srufactants A-1 (100 percent active) and A-2 (57 percent active) in which cyano-bearing Polymer A was the sole type of organosilicone component, the surfactant admixtures of the invention particularly outstanding in that the lower density foams (that is, lower as compared with the density of the foam produced with Surfactant A-1 in Run C-5) stabilized with the admixtures of the invention also had a desirably low burning extent, notwithstanding their highly open nature, as reflected by the breathability values.

EXAMPLES 7–15

In accordance with these examples, Surfactants A-B-1, A-B-2 and A-B-3 of the invention were employed as the surfactant component of Foam Formulation B which is of high density foam specification. Inasmuch as tin operating latitude is of particular concern with respect to formation of high density foam, a sutdy was made of the effect of variation in stannous octoate concentration (0.25, 0.30 and 0.35 p.h.p.). The results of these examples as well as the results of a corresponding study with the comparative surfactants, are given in Table VIII which follows.

EXAMPLE 16

In accordance with this example, Surfactant A-B-4 which is of the invention was employed as the surfactant component of flame-retarded Foam Formulation C (Table III). As identified in Table V, Surfactant A-B-4 contained: 65.7 weight percent of above-identified Polymer A which is illustrative of the cyanopropyl-modified polymethylsiloxane-poly(oxyethylene-oxypropylene) copolymers within the scope of Component A of the admixtures of the invention; 20 weight percent of Polymer B which is illustrative of the unmodified polymethylsiloxane-poly(oxyethylene-oxypropylene) copolymers within the scope of Component B of the

TABLE VIII

HIGH DENSITY FOAM

| Example No. | — | — | — | — | — | — | — | — | — | — | — | — |
|---|---|---|---|---|---|---|---|---|---|---|---|---|
| Run No. C-Formulation B (1) | 7 | 8 | 9 | 10 | 11 | 12 | 13 | 14 | 15 | 16 | 17 | 18 |
| Stannous octoate, php. | 0.25 | 0.30 | 0.35 | 0.25 | 0.30 | 0.35 | 0.25 | 0.30 | 0.35 | 0.25 | 0.30 | 0.35 |
| Surfactant (2) | — | A-1 | — | — | B-1 | — | — | B-2 | — | — | B-3 | — |
| Cream time, seconds | 11 | 11 | 10 | 10 | 10 | 10 | 10 | 10 | 10 | 11 | 10 | 10 |
| Rise time, seconds | 140 | 122 | 116 | 147 | 145 | 127 | 142 | 129 | 123 | 150 | 130 | 124 |
| Height of rise, inches | TIN SPLIT | 4.2 | 4.5 | TIN SPLIT | 4.5 | 4.7 | TIN SPLIT | 4.1 | 4.4 | TIN SPLIT | 4.5 | 4.7 |
| Foam Properties (3) | | | | | | | | | | | | |
| Density, pcf. | " | 2.36 | 2.32 | " | 2.23 | 2.21 | " | 2.27 | 2.26 | " | 2.26 | 2.22 |
| Breathability, SCFM | " | 2.8 | 1.55 | " | 1.75 | 0.85 | " | 1.85 | 1.0 | " | 1.8 | 1.65 |
| Burning extent, inches | " | 1.7 | 2.0 | " | 1.7 | 2.1 | " | 2.0 | 1.8 | " | 1.9 | 1.7 |
| Burning time, seconds | " | 35 | 41 | " | 33 | 44 | " | 40 | 40 | " | 38 | 35 |
| Example No. | — | — | — | 7 | 8 | 9 | 10 | 11 | 12 | 13 | 14 | 15 |
| Run No. C-Formulation B (1) | 19 | 20 | 21 | — | — | — | — | — | — | — | — | — |
| Stannous octoate, php | 0.25 | 0.30 | 0.35 | 0.25 | 0.30 | 0.35 | 0.25 | 0.30 | 0.35 | 0.25 | 0.30 | 0.35 |
| Surfactant (2) | — | A-2 | — | — | A-B-1 | — | — | A-B-2 | — | — | A-B-3 | — |
| Cream time, seconds | 10 | 10 | 10 | 11 | 10 | 10 | 11 | 10 | 10 | 10 | 10 | 10 |
| Rise time, seconds | 135 | 128 | 121 | 140 | 132 | 120 | 144 | 130 | 122 | 147 | 129 | 122 |
| Height of rise, inches | 4.2 | 4.4 | 4.4 | 4.2 | 4.4 | 4.6 | TIN SPLIT | 4.4 | 4.4 | TIN SPLIT | TIN SPLIT | 4.6 |
| Foam Properties (3) | | | | | | | | | | | | |
| Density, pcf. | 2.4 | 2.37 | 2.37 | 2.44 | 2.39 | 2.37 | " | 2.33 | 2.33 | " | " | 2.31 |
| Breathability, SCFM | 3.0 | 2.05 | 1.2 | 2.9 | 1.85 | 1.55 | " | 2.25 | 1.7 | " | " | 1.75 |
| Burning extent, inches | 2.0 | 1.6 | 2.1 | 1.7 | 1.9 | 1.5 | " | 2.0 | 2.0 | " | " | 1.5 |
| Burning time, seconds | 45 | 34 | 50 | 36 | 40 | 33 | " | 40 | 41 | " | " | 35 |

(1) As defined in Table II.
(2) The components of these surfactants are as indicated in Table V.
(3) In the foams of Run Nos. C-12, -14, -15, -17 and -18, basal split formation was observed.

The data of Table VIII show that, except for control Surfactant A-2 (57 percent active) employed in comparative Runs C-19 to C-21 and Surfactant A-B-1 of the invention (Examples 7–9), tin (or large) split formation was observed at the lower levels of stannous octoate. Therefore, from the standpoint of achieving excellent tin opering latitude in the production of high density foam, the admixtures of the invention contain less than 50 weight percent of the Component B polymer, Surfactants A-B-2 and A-B-3 having contained 50 and 75 weight percent, respectively, in contrast to the lower amount (25 weight percent) contained in Surfactant A-B-1. Although Surfactants A-B-2 and A-B-3 (as well as A-B-1) offer advantage as the foam stabilizing component of low density foam formulations as discussed above with reference to Examples 1–6, from the standpoint of outstanding broad applicability as the foam stabilizing component of a wide variety of formulations, the admixtures of the invention preferably contain from about 55 to about 90 percent of Component A and correspondingly from about 45 to about 10 weight percent of Component B, based on the combined weight of Components A and B in the admixture.

presently described admixtures, the poly(oxyethylene-oxypropylene) blocks of which in turn are allylcapped mixtures of respective low and high molecular weight Units X and Y as described herein; and 14.3 weight percent of Polyether Mono-ol II. The results are given in Table IX which follows.

TABLE IX

| Example | — | 16 |
|---|---|---|
| Run No. | C-22 | — |
| Formulation C (1) | | |
| Surfactant (2) | A-3 | A-B-4 |
| Height of rise, inches | 7.9 | 8 |
| Foam Properties | | |
| Cells per inch | 38 | 40 |
| Breathability, SCFM | 2.8 | 2.7 |
| Burning extent, inches | 2.4 | 2.5 |
| Burning time, seconds | 40 | 42 |

(1) As defined in Table III.
(2) As identified in Table V.

The results of Table IX further show that the use of cyanopropyl-modified copolymers within the scope of Component A in combination with polymers within the scope of Component B allows for the formation of flame-retarded foam without substantial sacrifice of the low burning extent achieved with control Surfactant A-3.

EXAMPLE 17

In accordance with this example, a potency determination was made of Srufactant A-B-4 of the invention. For this purpose, Surfactant A-B-4 (identified in Table V) was employed as the surfactant component of non flame-retarded Foam Formulation D of Table IV. The results (height of rise = 11.7 inches; cells per inch = 30; and breathability = 4.7 SCFM) indicate that Surfactant A-B-4 has good potency as a foam stabilizer of flexible urethane foam and provides good quality foam.

Further illustrative surfactant compositions of the present invention are the following:

1. An admixture containing about 85 weight percent of Polymer A and about 15 weight percent of Polymer B, wherein the said polymers are as defined hereinabove, and the said weight percentages are based on the total weight of Polymer A and Polymer B contained in the admixture.
2. An admixture containing about 65 weight percent of Polymer A and about 35 weight percent of Polymer BB, wherein the said polymers are as defined hereinabove, and the said weight percentages are based on the total weight of Polymer A and Polymer BB contained in the admixture.
3. Admixture (2) above diluted with Polyether Mono-ol II to an activity of about 80 weight percent, that is, to a resulting solution containing about 80 weight percent of admixture (2), the remaining weight being constituted of Polyether Mono-ol II.
4. An admixture containing about 65 weight percent of Polymer A and about 35 percent of a hydrolyzable polymethylsiloxane-polyoxyalkylene copolymer within the scope of the class of Component B polymers depicted by expression III hereinabove, having the following average composition,

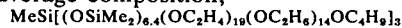
$MeSi[(OSiMe_2)_{6.4}(OC_2H_4)_{19}(OC_3H_6)_{14}OC_4H_9]_3$

5. An admixture containing about 80 weight percent of a cyanopropyl-substituted copolymer within the scope of Component A and about 20 weight percent of above-defined Polymer B said weight percentages being based on the combined weight of said polymers contained in the admixture, and wherein said cyanopropyl-substituted copolymer has the average composition,

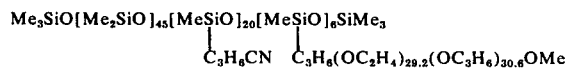
$Me_3SiO[Me_2SiO]_{45}[MeSiO]_{20}[MeSiO]_6SiMe_3$
$\quad\quad\quad\quad C_3H_6CN \quad C_3H_6(OC_2H_4)_{29.2}(OC_3H_6)_{30.6}OMe$ 6. An admixture containing about 90 weight percent of a cyanopropyl-substituted copolymer within the scope of Component A and about 10 weight percent of above-defined Polymer B, said weight percentages being based on the combined weight of said polymers contained in the admixture, and wherein said cyanopropyl-substituted copolymer has the average composition,

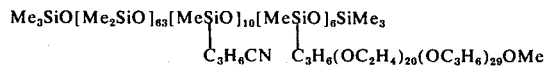
$Me_3SiO[Me_2SiO]_{63}[MeSiO]_{10}[MeSiO]_6SiMe_3$
$\quad\quad\quad\quad C_3H_6CN \quad C_3H_6(OC_2H_4)_{20}(OC_3H_6)_{29}OMe$ 7. An admixture containing about 65 weight percent of a cyanopropyl-substituted copolymer within the scope of Component A and about 35 weight percent of above-defined Polymer B, said weight percentages being based on the combined weight of said polymers contained in the admixture, and wherein said cyanopropyl-substitued copolymer has the average composition,

$Me_3SiO[Me_2SiO]_{60}[MeSiO]_5[MeSiO]_{5.2}SiMe_3$
$\quad\quad\quad\quad C_3H_6CN \quad C_3H_6(OC_2H_4)_{29.2}(OC_3H_6)_{30.6}OMe$ 8. An admixture containing about 75 weight percent of a cyanopropyl-substituted copolymer within the scope of Component A and about 25 weight percent of above-defined Polymer B, said weight percentages being based on the combined weight of said polymers contained in the admixture, and wherein said cyanopropyl-substituted copolymer has the average composition,

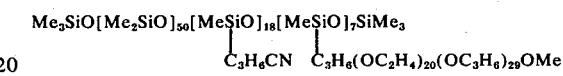
$Me_3SiO[Me_2SiO]_{50}[MeSiO]_{18}[MeSiO]_7SiMe_3$
$\quad\quad\quad\quad C_3H_6CN \quad C_3H_6(OC_2H_4)_{20}(OC_3H_6)_{29}OMe$ 9. An admixture containing about 65 weight percent of above-defined Polymer A, about 20 weight percent of above-defined Polymer B, and about 15 weight percent of Polyether Mono-ol I which is defined hereinabove with specific reference to the composition of Polymer B.

What is claimed is:

1. As novel compositons, an admixture containing from about 10 to about 90 weight percent of Component A and from about 90 to about 10 weight percent of Component B, said percentages being based on the total weight of A and B contained in the admixture, wherein:
   Component A is a cyano-bearing polysiloxanepolyoxyalkylene copolymer having the average composition,

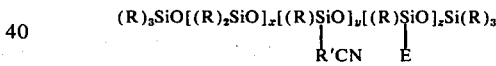
$(R)_3SiO[(R)_2SiO]_x[(R)SiO]_y[(R)SiO]_zSi(R)_3$
$\quad\quad\quad\quad\quad\quad R'CN \quad E$ where R is alkyl, R' has at least two carbon atoms and is bivalent alkylene or an oxyalkylene group the oxygen atom of which is bonded to silicon, x has an average value from about 10 to about 200, y has an average value from about 3 to about 100, z has an average value from about 2 to about 30, and E comprises a polyoxyalkylene block the oxyalkylene content of which is constituted of from about 20 to about 65 weight percent of oxyethylene; and
   Component B is a polyalkylsiloxane-polyoxyalkylene copolymer in which the polyoxyalkylene content is constituted of from about 20 to about 75 weight percent of oxyethylene.
2. An admixture as defined in claim 1 in which R of the Component A copolymer is methyl.
3. An admixture as defined in claim 1 in which alkyl of the polyalkylsiloxane portion of the Component B copolymer is methyl.
4. An admixture as defined in claim 3 in which the polymethylsiloxane and polyoxyalkylene portions of the copolymer are linked through a silicon-to-carbon bond.
5. An admixture as defined in claim 3 in which the polymethylsiloxane and polyoxyalkylene portions of said copolymer are linked through a silicon-to-oxygen-to-carbon bond.

6. An admixture as defined in claim 1 in which R'CN of the Component A copolymer is cyanoalkyl having from two to four carbon atoms.

7. An admixture as defined in claim 1 in which R'CN of the Component A copolymer is cyanoalkoxy having from two to four carbon atoms.

8. An admixture as defined in claim 1 in which R of the Component A copolymer is methyl, R'CN is cyanopropyl and E comprises an organic-capped poly(oxyethylene-oxypropylene) block linked to silicon by a bivalent alkylene group having from two to six carbon atoms.

9. An admixture as defined in claim 1 in which said Component A is present in an amount from about 55 to about 90 weight percent and said Component B is present in an amount from about 45 to about 10 weight percent, based on the combined weight of Components A and B in the admixture.

10. An admixture as defined in claim 1 in which the remaining weight of oxyalkylene of respective Components A and B is oxypropylene.

11. As novel compositions, an admixture containing from about 10 to about 90 weight percent of Component A and from about 90 to about 10 weight percent of Component B, said percentages being based on the total weight of A and B contained in the admixture, wherein:

Component A is a cyano-bearing polysiloxanepolyoxyalkylene copolymer having the average composition,

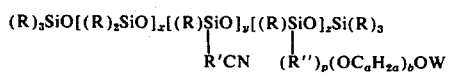

wherein: R is alkyl having from 1 to 10 carbon atoms, R' is bivalent alkylene or an oxyalkylene group the oxygen atom of which is bonded to silicon, $x$ has an average value from about 10 to about 200, $y$ has an average value from about 3 to about 100, $z$ has an average value from about 2 to about 30, R'' comprises a bivalent alkylene group having from two to six carbon atoms one carbon atom of which is bonded to silicon, W is an organic cap, $p$ is zero or one, $a$ has a value from 2 to 4 provided from about 20 to about 65 weight percent of the oxyalkylene units of the polyoxyalkylene chain, $-(C_aH_{2a}O)_b-$, is constituted of oxyethylene units and $b$ has an average value such that the average molecular weight of the polyoxyalkylene chain is froom about 1000 to about 6000; and Component B is a polyalkylsiloxane-polyoxyalkylene copolymer having the average composition,

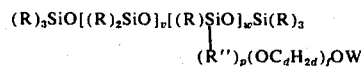

wherein: R is alkyl having from 1 to 10 carbon atoms, R'' comprises a bivalent alkylene group having from two to six carbon atoms one carbon atom of which is bonded to silicon, W is an organic cap, $v$ has an average value from about 10 to about 60, $w$ has an average value from about 2 to about 10, $p$ is zero or one, $d$ has a value from 2 to 4 provided from about 20 to about 75 weight percent of the polyoxyalkylene chain, $-(OC_dH_{2d})_f-$, is constituted of oxyethylene, and $f$ has an average value such that the average molecular weight of the polyoxyalkylene chain is from about 800 to about 6000.

12. An admixture as defined in claim 11 wherein in each of said Component A and Component B polymers, R is methyl, p is one, R'' is bivalent alkylene having from 2 to 4 carbon atoms, and wherein —R'CN of said Component A polymer is $-R°CN$ or $-OR°CN$ where R° is bivalent alkylene having from 2 to 6 carbon atoms.

13. An admixture as defined in claim 12 in which —R°CN of said Component A polymer is gamma-cyano-propyl.

14. An admixture as defined in claim 11 which contains as an additional component thereof, a normally liquid organic poly(oxyalkylene) compound.

15. An admixture as defined in claim 14 in which said organic poly(oxyalkylene) compound is an alkanol-started, hydroxyl-terminated poly(oxyethylene-oxypropylene) ether.

16. As novel compositions, an admixture containing from about 10 to about 90 weight percent of Component A and from about 90 to about 10 weight percent of Component B, said percentages being based on the total weight of A and B contained in the admixture, wherein:

Component A is a cyano-bearing polysiloxane-polyoxyalkylene copolymer having the average composition,

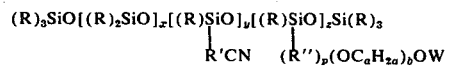

wherein: R is alkyl having from 1 to 10 carbon atoms, R' is bivalent alkylene or an oxyalkylene group the oxygen atom of which is bonded to silicon, $x$ has an average value from about 10 to about 200, $y$ has an average value from about 3 to about 100, $z$ has an average value from about 2 to about 30, R'' comprises a bivalent alkylene group having from two to six carbon atoms one carbon atom of which is bonded to silicon, W is an organic cap, $p$ is zero or one, $a$ has a value from 2 to 4 provided from about 20 to about 65 weight percent of the oxyalkylene units of the polyoxyalkylene chain, $-(C_aH_{2a}O)_b-$, is constituted of oxyethylene units and $b$ has an average value such that the average molecular weight of the polyoxyalkylene chain is from about 1000 to about 6000; and Component B is a polyalkylsiloxane-poly(oxyethylene-oxypropylene) block copolymer having a polysiloxane content from about 10 to about 35 weight percent, and an oxyethylene content from about 20 to about 75 weight percent, based on the total weight of oxyethylene and oxypropylene contained in the polymer.

17. An admixture as defined in claim 16 in which the polysiloxane portion of the Component B polymer consists essentially of monofunctional trialkylsiloxy units, difunctional dialkylsiloxy units, and difunctional monoalkylsiloxy units in which the remaining valence of the respective silicon atoms is satisfied by a bond to the poly(oxyethylene-oxypropylene) portion of the polymer.

18. An admixture as defined in claim 16 in which the polysiloxane portion of the Component B polymer consists essentially of trifunctional alkylsiloxy units, difunctional dialkylsiloxy units and silicon-bonded alkoxy groups, and in which the polysiloxane and poly(oxyethyleneoxypropylene) portions of the polymer are linked through an Si—O—C linkage.

19. An admixture as defined in claim 16 in which the poly(oxyethylene-oxypropylene) portion of said Component B polymer is comprised of an admixture of Units X and Y which are organic-capped poly(oxyethylene-oxypropylene) blocks joined to respective silicon atoms of the polysiloxane portion of said Component B polymer directly by an Si-O-C linkage or through a linking member comprising a bivalent alkylene group a carboon atom of which is linked to silicon, wherein Unit X represents from about 50 to about 95 weight percent, based on the total weight of Units X and Y in said admixture thereof, of low molecular weight poly-(oxyethylene-oxypropylene) copolymers having an average molecular weight from about 800 to about 3000, and Unit Y represents from about 50 to about 5 weight percent, based on teh total weight of Units X and Y in said admixture therof, a higher molecular weight poly(oxyethylene-oxypropylene) copolymers having an average molecular weight from about 1600 to about 6000, provided the said admixture of Units X and Y has an average molecular weight no higher than about 6000.

20. As novel compositions, an admixture containing from about 10 to about 90 weight percent of Component A and from about 90 to about 10 weight percent of Component B, and from zero to about 60 weight percent of a normally liquid alkanol-started, hydroxyl-terminated poly(oxyethylene-oxypropylene) ether, said percentages being based on the total weight of A and B contained in the admixture, wherein:

Component A is a cyano-bearing polysiloxane-poly(oxyalkylene) copolymer having the average composition,

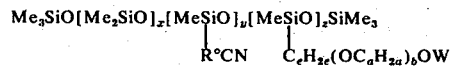

where Me is methyl, $R°$ is bivalent alkylene having from 2 to 6 carbon atoms, $x$ has an average value from about 20 to about 100, $y$ has an average value from about 4 to about 30, $z$ has an average value from about 2 to about 10, W is an organic cap, $e$ has a value from 2 to 4; $p$ is zero or one, $a$ has a value from 2 to 4 provided from about 20 to about 65 weight percent of the oxyalkylene units of the polyoxyalkylene chain, $—(C_aH_{2a}O)_b—$, is constituted of oxyethylene untis and $b$ has an average value such that the average molecular weight of the polyoxyalkylene chain is from about 1000 to about 6000; and Component B is a polymethylsiloxane-poly(oxyethylene-oxypropylene) copolymer having the average composition,

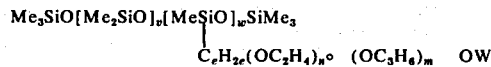

where Me is methyl, W is an organic cap, $v$ has an average value from about 10 to about 60, $w$ has an average value from about 2 to about 10, $e$ has a value from 2 to 4, and $—(OC_2H_4)_{n°}\,(OC_3H_6)_{m°}\,OW$ is comprised of an admixture of Units X and Y having said formula wherein the values of $n°$ and $m°$ are determined by the following conditions prevailing for Units X and Y: Unit X represents from about 60 to about 90 weight percent, based on the combined weight of Units X and Y in said admixture thereof, of low molecular weight poly(oxyethylene-oxypropylene) copolymer having an average molecular weight from about 1400 to about 2500, Unit Y constitutes from about 40 to about 10 weight percent, based on the combined weight of Units X and Y in said admixture thereof, of higher molecular weight poly(oxyethylene-oxypropylene) copolymers having an average moleular weight from aabout 2500 to about 3500, provided the admixture of said Units X and Y has an average molecular weight no higher than about 4000, the oxyethylene content of siad Units X and Y being within the range from about 20 to about 75 weight percent.

21. An admixture as defined in claim 20 wherein the average molecular weight of said Unit X of the Component B polymer is no higher than about 2200.

22. An admixture as defined in claim 20 wherein $e$ of said Component A polymer has a value of three, and $—R°CN$ is gamma-cyanopropyl.

23. An admixture as defined in claim 20 wherein W of said Component B polymer is $R°°$ which is a monovalent hydrocarbon group of 1 to 12 carbon atoms, and said admixture of Units X and Y is derived from an alkenyl-capped mixture of corresponding $R°°—OH$ started poly(oxyethylene-oxypropylene) copolymers, wherein $R°°$ is as aforesaid, and said alkenyl cap has from 2 to 4 carbon atoms.

24. An admixture as defined in claim 23 wherein aid admixture of Units X and Y is derived from an allyl-capped mixture of alkanol-started poly(oxyethylene-oxypropylene) copolymers.

25. An admixture as defined in claim 23 wherein said admixture of Units X and Y is derived from an allyl-capped mixture of butanol-started poly(oxyethylene-oxypropylene) copolymers.

26. An admixture as defined in claim 20 wherein, when present, said normally liquid alkanol-started, hydroxyl-terminated poly(oxyethylene-oxypropylene) ether is a mixture of butanol-started poly(oxyethylene-oxypropylene) copolymers having the average composition, $C_4H_9(OC_3H_6)_u(OC_2H_4)_sOH$, wherein $s$ has an average value from about 8 to about 50 and $u$ has an average value from about 6 to about 40.

27. An admixture as defined in claim 26 containing at least about 5 weight percent of said normally liquid, alkanol-started ether.

28. An admixture as defined in claim 20 in which Component A is present in an amount of at least about 20 weight percent and said Component B is present in an amount no more than about 80 weight percent.

29. An admixture as defined in claim 20 in which Component A is present in an amount of at least about 55 weight percent and Component B is present in an amount no more than about 45 weight percent.

30. A process for producing flexible polyurethane foams which comprises reacting and foaming a reaction mixture comprising: (a) a polyether polyol reacant containing an average of at least two hydroxyl groups per molecule; (b) a polyisocyanate reactant containing at least two isocyanato groups per molecule; (c) a blowing agent; (d) a catalyst comprising an amine; and (e) a foam stabilizer comprising an admixture containing from about 10 to about 90 weight percent of Component A and from about 90 to about 10 weight percent of Component B, said percentages being based on the total weight of A and B contained in the admixture, wherein:

Component A is a cyano-bearing polysiloxane-polyoxyalkylene copolymer having the average composition,

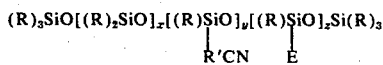

where R is alkyl, R' has at least two carbon atoms and is bivalent alkylene or an oxyalkylene group the oxygen atom of which is bonded to silicon, $x$ has an average value from about 10 to about 200, $y$ has an average value from about 3 to about 100, $z$ has an average value from about 2 to about 30, and E comprises a polyoxyalkylene block the oxyalkylene content of which is constituted of from about 20 to about 65 weight percent of oxyethylene; and Component B is a polyalkylsiloxane-polyoxyalkylene copolymer in which the polyoxyalkylene content is constituted of from about 20 to about 75 weight percent of oxyethylene.

31. A process as defined in claim 30 in which a flame-retardant is present as an additional component of said reaction mixture.

32. A process for producing flame-retarded, flexible polyurethane foams which comprises reacting and foaming a reaction mixture comprising: (a) a polyether polyol reactant containing an average of at least two hydroxyl groups per molecule; (b) an organic polyisocyanate reactant containing at least two isocyanato groups per molecule; (c) a blowing agent comprising water; (d) a catalyst comprising a tertiary amine; (e) a co-catalyst comprising an organic derivative of tin; (f) a flame-retarding agent; and (g) a foam stabilizer comprising an admixture containing from about 10 to about 90 weight percent of Component A and from about 90 to about 10 weight percent Component B, and from zero to about 60 weight percent of a normally liquid alkanol-started, hydroxyl-terminated poly(oxyethylene-oxypropylene) ether, said percentages being based on the total weight of A and B contained in the admixture, wherein:

Component A is a cyano-bearing polysiloxane-poly(oxyalkylene) copolymer having the average composition,

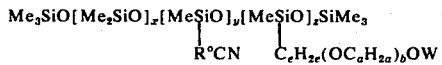

where Me is methyl, R° is bivalent alkylene having from 2 to 6 carbon atoms, $x$ has an average value from about 20 to about 100, $y$ has an average value from about 4 to about 30, $z$ has an average value from about 2 to about 10, W is an organic cap, $e$ has a value from about 2 to 4; $p$ is zero or one, $a$ has a value from 2 to 4 provided from about 20 to about 65 weight percent of the oxyalkylene units of the polyoxyalkylene chain, $-(C_aH_{2a}O)_b-$, is constituted of oxyethylene units and $b$ has an average value such that the average molecular weight of the polyoxyalkylene chain is from about 1000 to about 6000; and Component B is a polymethylsiloxane-poly(oxyethylene-oxypropylene) copolymer having the average composition,

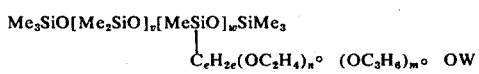

where Me is methyl, W is an organic cap, $v$ has an average value from about 10 to about 60, $w$ has an average value from about 2 to about 10, $e$ has a value from 2 to 4, and $-(OC_2H_4)_{n°}(OC_3H_6)_{m°}$ OW is comprised of an admixture of Units X and Y having said formula wherein the values of $n°$ and $m°$ are determined by the following conditions prevailing for Units X and Y: Unit X represents from about 60 to about 90 weight percent, based on the combined weight of Units X and Y in said admixture thereof, of low molecular weight poly(oxyethylene-oxypropylene) copolymer having an average molecular weight from about 1400 to about 2500, Unit Y constitutes from about 40 to about 10 weight percent, based on the combined weight of Units X and Y in said admixture thereof, of higher molecular weight poly(oxyethylene-oxypropylene) copolymers having an average molecular weight from about 2500 to about 3500, provided the admixture of said Units X and Y has an average molecular weight no higher than about 4000, the oxyethylene content of said Units X and Y being within the range from about 20 to about 75 weight percent.

33. A flame-retarded foam produced by the process of claim 32.

34. A process as defined in claim 32 in which in said foam stabilizer (g), $-R°CN$ of said Component A is gamma-cyanopropyl.

35. A process as defined in claim 34 in which said foam stabilizer (g) contains at least about 5 weight percent of said mormally liquid alkanol-started ether.

36. A process as defined in claim 32 in which said Component B is present in an amount no more than about 45 weight percent.

* * * * *

UNITED STATES PATENT OFFICE

CERTIFICATE OF CORRECTION

Patent No. 3,935,123                    Dated January 27, 1976

Inventor(s)   Bela Prokai and Bernard Kanner

It is certified that error appears in the above-identified patent and that said Letters Patent are hereby corrected as shown below:

Column 12, line 14, that portion of the formula reading $-(OC_2H_4(_n$.  should read  $-(OC_2H_4)_n$.

Column 13, line 53, before "in", for "b" read -- B --.
Column 26, line 34, for "thier" read -- their --. Column 27, line 20, for "concendtration" read -- concentration --; line 64, for "Talbes" read -- Tables --; line 65, for "Srufactants" read -- Surfactants --. Column 29, line 9, for "sutdy" read -- study --. Columns 29-30, Table VIII, opposite the fourth of the left-hand legends reading "Stannous octoate, php." and under columns headed "8" and "9", for "0.300.35" read -- 0.30 0.35 --; Table VIII, opposite the tenth of the left-hand legends reading "Density, pcf." and under columns headed "8" and "9", for "2.362.32" read -- 2.36 2.32 --; Table VIII, opposite the tenth from the last of the left-hand legends reading "Stannous octoate, php." and under the second and third columns of data headed "8" and "9", for "0.300.35" read -- 0.30 0.35 --; Table VIII, opposite the fourth from the last of the left-hand legends reading "Density, pcf." and under the second and third columns of data headed "8" and "9", for "2.372.37" read -- 2.37 2.37 --. Column 31, line 4, for "Srufactant" read -- Surfactant --; line 37, that portion of the formula reading $(OC_2H_6)_{14}$  should read  $(OC_3H_6)_{14}$ Column 35, line 18, before "total", for "teh" read -- the --; line 19, after "admixture", for "therof, a" read -- thereof, of --; line 59, that portion of the formula reading $(OC_3H_6)_m$  should read  $(OC_3H_6)_m$.

UNITED STATES PATENT OFFICE
CERTIFICATE OF CORRECTION

Patent No. 3,935,123    Dated January 27, 1976

Inventor(s) Bela Prokai and Bernard Kanner

It is certified that error appears in the above-identified patent and that said Letters Patent are hereby corrected as shown below:

Column 36, line 10, for "aabout" read -- about --; line 13, for "siad" read -- said --; line 29, after "wherein", for "aid" read -- said --; line 58, "reacant" read- -- reactant -- Column 38, line 3, delete "about"; line 48, before "liquid", for "mormally" read -- normally --.

Signed and Sealed this

Thirty-first Day of May 1977

[SEAL]

Attest:

RUTH C. MASON
*Attesting Officer*

C. MARSHALL DANN
*Commissioner of Patents and Trademarks*